United States Patent
Yamakawa et al.

(10) Patent No.: US 8,395,277 B2
(45) Date of Patent: Mar. 12, 2013

(54) CONTROL DEVICE AND CONTROL METHOD FOR VEHICLE

(75) Inventors: Toshifumi Yamakawa, Okazaki (JP); Hideto Hanada, Toyota (JP); Kazuhito Hayashi, Inazawa (JP); Masayoshi Suhama, Toyota (JP); Toshiya Hashimoto, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 389 days.

(21) Appl. No.: 12/922,963

(22) PCT Filed: Dec. 22, 2008

(86) PCT No.: PCT/JP2008/073321
§ 371 (c)(1),
(2), (4) Date: Sep. 16, 2010

(87) PCT Pub. No.: WO2009/116216
PCT Pub. Date: Sep. 24, 2009

(65) Prior Publication Data
US 2011/0006598 A1 Jan. 13, 2011

(30) Foreign Application Priority Data
Mar. 18, 2008 (JP) ................................ 2008-069572

(51) Int. Cl.
*B60L 1/00* (2006.01)
(52) U.S. Cl. ...................................................... 307/9.1
(58) Field of Classification Search .................... 307/9.1
See application file for complete search history.

(56) References Cited

U.S. PATENT DOCUMENTS

| 2006/0119297 A1 | 6/2006 | Okamura et al. |
| 2007/0108936 A1 | 5/2007 | Yaguchi |
| 2007/0278986 A1 | 12/2007 | Okamura |

FOREIGN PATENT DOCUMENTS

| JP | A-2005-51894 | 2/2005 |
| JP | A-2007-89262 | 4/2007 |
| JP | A-2007-202386 | 8/2007 |
| JP | A-2007-252181 | 9/2007 |
| JP | A-2007-306658 | 11/2007 |
| JP | A-2007-325351 | 12/2007 |
| WO | WO 03/015254 A1 | 2/2003 |
| WO | WO 2005/013473 A1 | 2/2005 |
| WO | WO 2005/081395 A1 | 9/2005 |

OTHER PUBLICATIONS

International Search Report dated Apr. 7, 2009 for corresponding International Application No. PCT/JP2008/073321 (with translation).

*Primary Examiner* — Robert L. DeBeradinis
(74) *Attorney, Agent, or Firm* — Oliff & Berridge, PLC

(57) ABSTRACT

A vehicle includes a converter for stepping up power provided from a power storage device, and an inverter for converting the power output from converter and outputting it to an alternating-current motor for driving the vehicle. In the vehicle, a rectangular voltage control unit controls the inverter by means of rectangular wave voltage control that is based on a torque command value and the like, so as to control an output torque of the alternating-current motor. A system voltage control unit controls a system voltage, which is an output voltage of the converter. The system voltage control unit lifts a restriction on a system voltage command value based on an accelerator pedal position and the like, and then increases it. When increasing the system voltage command value during the rectangular wave voltage control for the inverter, a cooperative control unit increases the system voltage command value and the torque command value in a cooperative manner.

14 Claims, 18 Drawing Sheets

| CONTROL | PWM CONTROL METHODS | | RECTANGULAR WAVE VOLTAGE CONTROL METHOD |
|---|---|---|---|
| | SINUSOIDAL WAVE PWM | OVERMODULATION PWM | RECTANGULAR WAVE (ONE PULSE) |
| WAVEFORM OF OUTPUT VOLTAGE OF INVERTER | FUNDAMENTAL WAVE COMPONENT | FUNDAMENTAL WAVE COMPONENT | FUNDAMENTAL WAVE COMPONENT |
| MODULATION FACTOR | 0~0.61 | 0.61~0.78 | 0.78 |
| FEATURE | REDUCED FLUCTUATION OF TORQUE | IMPROVED OUTPUT IN MIDDLE SPEED REGION | IMPROVED OUTPUT IN HIGH SPEED REGION |

FIG.3

| | PWM CONTROL METHODS | | RECTANGULAR WAVE VOLTAGE CONTROL METHOD |
|---|---|---|---|
| CONTROL | SINUSOIDAL WAVE PWM | OVERMODULATION PWM | RECTANGULAR WAVE (ONE PULSE) |
| WAVEFORM OF OUTPUT VOLTAGE OF INVERTER | FUNDAMENTAL WAVE COMPONENT | FUNDAMENTAL WAVE COMPONENT | FUNDAMENTAL WAVE COMPONENT |
| MODULATION FACTOR | 0~0.61 | 0.61~0.78 | 0.78 |
| FEATURE | REDUCED FLUCTUATION OF TORQUE | IMPROVED OUTPUT IN MIDDLE SPEED REGION | IMPROVED OUTPUT IN HIGH SPEED REGION |

CONTROL DEVICE AND CONTROL METHOD FOR VEHICLE

TECHNICAL FIELD

The present invention relates to control of a vehicle, in particular, control of a vehicle including a converter for stepping up power provided from a power storage device and outputting it and an inverter for converting the power output from the converter and outputting it to a vehicular driving motor.

BACKGROUND ART

Recently, hybrid vehicles and electric vehicles have been put into practical use as environment friendly vehicles. In each of such hybrid vehicles or electric vehicles, power needs to be provided to the motor in accordance with load on a motor in order to appropriately drive the vehicle and improve energy efficiency. For example, Japanese Patent Laying-Open No. 2007-89262 (Patent Document 1) discloses a control device allowing for improved fuel efficiency without decreasing travel performance of a vehicle.

The control device disclosed in Japanese Patent Laying-Open No. 2007-89262 controls a vehicle including a step-up converter for stepping up a voltage provided from a direct-current power source and outputting it; and an inverter for converting the direct-current power output from the step-up converter into alternating-current power and outputting it to a vehicular driving motor. The control device appropriately changes a target value for the output voltage of the step-up converter in accordance with a travel mode requested by a driver. When a responsiveness oriented mode is selected, the control device sets as the target value a fixed voltage value higher than a voltage corresponding to an output required by the motor, and controls the step-up converter. On the other hand, when a fuel efficiency oriented mode is selected, the control device sets the target value based on a requested torque for driving the motor, and controls the step-up converter. In this way, the fuel efficiency can be improved without decreasing travel performance of the vehicle.

In the control device disclosed in Japanese Patent Laying-Open No. 2007-89262, when the driver selects the fuel efficiency oriented mode, the output voltage of the step-up converter is controlled to be a value set based on the requested torque for driving the motor. On this occasion, the output voltage of the step-up converter is smaller than that when the response oriented mode is selected. Accordingly, loss can be reduced in the step-up converter. In this way, the travel mode oriented to the travel performance of the vehicle can be employed while improving fuel efficiency.

Patent Document 1: Japanese Patent Laying-Open No. 2007-89262
Patent Document 2: WO 2003/015254

DISCLOSURE OF THE INVENTION

Problems To Be Solved By the Invention

When the output voltage of the step-up converter (hereinafter, also referred to as "system voltage") in the fuel efficiency oriented mode is restricted to a value smaller than that set in the response oriented mode as in the control device disclosed in Japanese Patent Laying-Open No. 2007-89262, torque may be insufficient in an event that momentarily requires a large torque, for example, in order to pass a vehicle traveling ahead. If the system voltage is increased to counteract the insufficient torque during rectangular wave voltage control for the inverter, the output torque of the motor may not be controlled as designated by a torque command value.

Specifically, only one switching is performed for each cycle of an electrical angle during the rectangular wave voltage control for the inverter, and one switching period is longer than that in PWM (Pulse Width Modulation) control. Hence, if the system voltage is increased during the rectangular wave voltage control, there is a difficulty in reflecting the change of the system voltage in the switching period unlike in the PWM control. Accordingly, the voltage output from the inverter to the motor may not have a value equal to a voltage value commanded in the rectangular wave voltage control. If the torque command value is increased under such a circumstance, the output torque of the motor may not be controlled as designated by the torque command value.

The present invention is made to solve the foregoing problem, and its object is to provide a control device and a control method for a vehicle including a converter for stepping up power provided from a power storage device and outputting it and an inverter for converting the power output from the converter and outputting it to a vehicular driving motor. The control device and the control method allow the motor to output a torque as designated by a command value, when increasing the output voltage of the converter.

Means For Solving the Problems

A control device according to the present invention controls a vehicle including a power storage device, a converter for variably stepping up a voltage provided from the power storage device, an inverter for converting power output from the converter, and a motor that operates using the power output from the inverter. The control device includes: a first control unit for controlling an output voltage of the converter based on a voltage command value; a second control unit for controlling the inverter to supply the motor with a rectangular wave voltage that is based on a torque command value, which designates an output torque of the motor, and the voltage command value; and a third control unit for controlling the voltage command value and the torque command value such that a difference between the torque command value and an actual output torque of the motor is smaller than a predetermined value when increasing the voltage command value.

Preferably, the third control unit increases the voltage command value at a first increase rate small enough to allow the difference between the torque command value and the actual output torque to be smaller than the predetermined value, and increases the torque command value at a second increase rate corresponding to the first increase rate, while increasing the voltage command value.

More preferably, the second increase rate is an increase rate of the torque command value for matching a timing at which the voltage command value reaches a step-up upper limit value of the converter, with a timing at which the torque command value reaches a torque upper limit value corresponding to the step-up upper limit value.

More preferably, the third control unit increases the torque command value after increasing the voltage command value to a step-up upper limit value of the converter.

More preferably, the third control unit increases the voltage command value and the torque command value, stepwisely and alternately.

More preferably, the third control unit increases the voltage command value and the torque command value at maximal increase rates respectively.

More preferably, the second control unit supplies the rectangular wave voltage to the motor once in each cycle of an electrical angle determined based on a rotational position of the motor. The control device further includes a rotation speed detecting unit for detecting a rotation speed per unit time of the motor. The third control unit changes an increase rate of the voltage command value in accordance with the rotation speed such that an amount of increase in the output voltage during a period of time from start of supplying the rectangular wave voltage to end thereof once is a fixed value irrespective of the rotation speed.

More preferably, the second control unit corrects the period of time of supplying the rectangular wave voltage once, based on the amount of increase in the output voltage.

More preferably, the control device further includes a voltage detecting unit for detecting the output voltage. Assuming that N is a natural number, the second control unit sets a period of time of supplying the rectangular wave voltage for the N-th time, based on the torque command value and the output voltage, which has been detected by the voltage detecting unit upon starting to supply the rectangular wave voltage for the N−1-th time.

More preferably, the control device further includes: an acceleration request detecting unit for detecting a degree of acceleration requested by a driver of the vehicle; a restricting unit for restricting the voltage command value to a restriction value smaller than a step-up upper limit value of the converter; and a lifting unit for lifting a restriction on the voltage command value put by the restricting unit, when the restricting unit restricts the voltage command value and the degree of acceleration requested, which has been detected by the acceleration request detecting unit, is larger than a predetermined degree. When the lifting unit lifts the restriction, the third control unit increases the voltage command value and the torque command value.

More preferably, the control device further includes: an acceleration request detecting unit for detecting a degree of acceleration requested by a driver of the vehicle; a current detecting unit for detecting a current provided to the motor; a rotational position detecting unit for detecting a rotational position of the motor; a rotation speed detecting unit for detecting a rotation speed per unit time of the motor; an estimation unit for estimating the actual output torque of the motor based on the current detected by the current detecting unit and the rotational position detected by the rotational position detecting unit; a restricting unit for restricting the voltage command value to a restriction value smaller than a step-up upper limit value of the converter; and a lifting unit for lifting a restriction on the voltage command value put by the restricting unit, when the restricting unit restricts the voltage command value, when the degree of acceleration requested, which has been detected by the acceleration request detecting unit, is larger than a predetermined degree, and when the output torque estimated by the estimation unit reaches a torque upper limit value determined based on the rotation speed detected by the rotation speed detecting unit and the restriction value. When the lifting unit lifts the restriction on the voltage command value, the third control unit increases the voltage command value and the torque command value.

More preferably, the control device further includes a mode detecting unit for detecting which travel mode is selected by the driver of the vehicle from a normal mode and a saving mode. When the mode detecting unit detects that the saving mode is selected, the restricting unit restricts the voltage command value to the restriction value.

Effects of the Invention

According to the present invention, when increasing the voltage command value, which designates the output voltage of the converter, the voltage command value and the torque command value are controlled such that the difference between the torque command value, which designates the output torque of the motor, and the actual output torque of the motor are smaller than the predetermined value, in consideration of the fact that the inverter is controlled by the rectangular wave voltage control. In this way, a deviation between the voltage command value and the output voltage of the inverter is restrained to the minimum in the rectangular wave voltage control, thereby achieving restraint of deviation of torque.

BRIEF DESCRIPTION OF THE DRAWINGS

FIG. 3 illustrates control methods used in the motor driving system.

DESCRIPTION OF THE REFERENCE SIGNS

Figure 1:
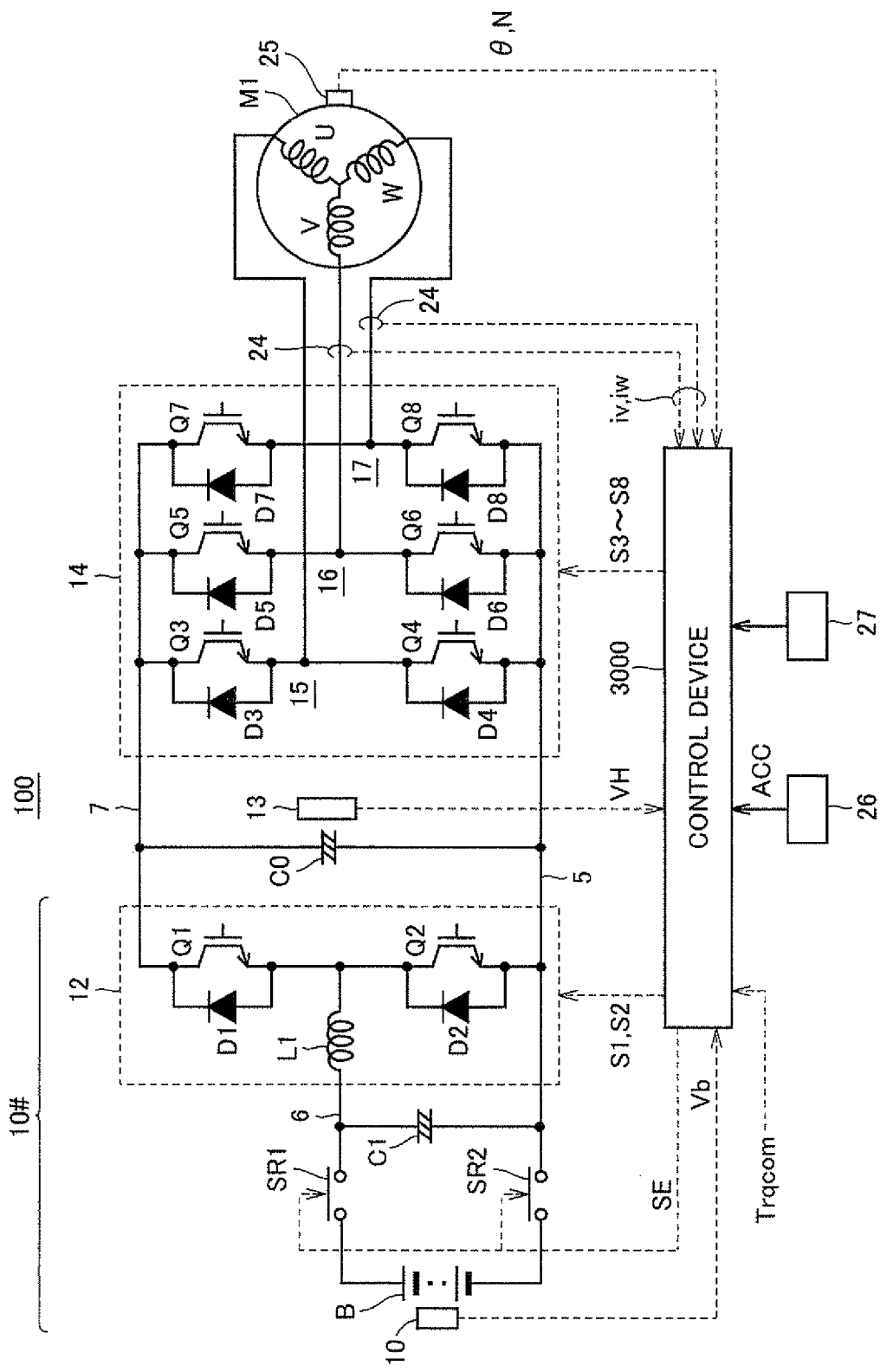
FIG. 1 is a diagram of an entire configuration of a motor driving system in a first embodiment of the present invention.

5: negative electrode line; 6, 7: positive electrode line; 10, 13: voltage sensor; 12: converter; 14: inverter; 15: U-phase arm; 16: V-phase arm; 17: W-phase arm; 24: current sensor; 25: resolver; 26: accelerator pedal position sensor; 27: eco switch; 100: motor driving system; 3000: control device; 3100: coordinate converting unit; 3200: torque estimation unit; 3300: rectangular voltage control unit; 3310: torque command value calculating unit; 3320: rectangular wave generating unit; 3330: signal generating unit; 3400: system voltage control unit; 3410: system voltage command value calculating unit; 3420: signal generating unit; 3500: cooperative control unit; B: direct-current power source; C0, C1: smoothing capacitor; D1-D3: anti-parallel diode; L1: reactor; M1: alternating-current motor; Q1-Q8: switching element; SR1, SR2: system relay.

BEST MODES FOR CARRYING OUT THE INVENTION

The following describes embodiments of the present invention with reference to figures. In the description below, the same components are given the same reference characters. They have the same names and the same functions. Hence, they are not repeatedly described in detail.

First Embodiment

Referring to FIG. 1, a motor driving system 100 of a vehicle including a control device according to an embodiment of the present invention will be described. It should be noted that the present invention is applicable to vehicles such as electric vehicles driven by a motor used in motor driving system 100; hybrid vehicles including both a motor used in motor driving system 100 and an engine as driving sources; or the like.

Motor driving system 100 includes a direct-current voltage generating unit 10#, a smoothing capacitor C0, an inverter 14, an alternating-current motor M1, and a control device 3000.

Alternating-current motor M1 is a driving motor for generating torque to drive a driving wheel of a vehicle. Alternatively, alternating-current motor M1 may be configured to have a function of a power generator driven by an engine, and may be configured to have functions of both a motor and a power generator. Further, alternating-current motor M1 may operate as a motor for the engine and may be incorporated in a hybrid vehicle as a component capable of starting the engine, for example.

Direct-current voltage generating unit 10# includes a direct-current power source B configured to be chargeable, system relays SR1, SR2, a smoothing capacitor C1, and a converter 12.

Direct-current power source B is configured to contain a secondary battery such as a nickel hydrogen battery or a lithium ion battery. Alternatively, direct-current power source B may be constituted by a power storage device such as an electric double layer capacitor. Direct-current power source B outputs a direct-current voltage Vb, which is detected by a voltage sensor 10. Voltage sensor 10 sends direct-current voltage Vb thus detected, to control device 3000.

System relay SR1 is connected between the positive electrode terminal of direct-current power source B and a positive electrode line 6, whereas system relay SR2 is connected between the negative electrode terminal of direct-current power source B and a negative electrode line 5. Each of system relays SR1, SR2 is turned on/off in response to a signal SE from control device 3000. More specifically, each of system relays SR1, SR2 is turned on in response to signal SE of the H (logic high) level supplied from control device 3000, and is turned off in response to signal SE of the L (logic low) level supplied therefrom. Smoothing capacitor C1 is connected between positive electrode line 6 and negative electrode line 5.

Converter 12 includes a reactor L1, power semiconductor switching elements Q1, Q2, and diodes D1, D2.

Power semiconductor switching elements Q1 and Q2 are connected between a positive electrode line 7 and negative electrode line 5 in series. Turning on/off power semiconductor switching elements Q1 and Q2 is controlled by means of switching control signals S1 and S2 supplied from control device 3000.

In the embodiment of the present invention, an IGBT (Insulated Gate Bipolar Transistor), a power MOS (Metal Oxide Semiconductor) transistor, a power bipolar transistor, or the like can be used as each of the power semiconductor switching elements (hereinafter, each simply referred to as "switching element"). Anti-parallel diodes D1, D2 are provided for switching elements Q1, Q2 respectively.

Reactor L1 is connected between a connection node of switching elements Q1, Q2 and positive electrode line 6. Further, smoothing capacitor C0 is connected between positive electrode line 7 and negative electrode line 5.

Inverter 14 includes a U-phase arm 15, a V-phase arm 16, and a W-phase arm 17, which are provided in parallel between positive electrode line 7 and negative electrode line 5. Each of the phase arms includes switching elements connected between positive electrode line 7 and negative electrode line 5 in series. For example, U-phase arm 15 includes switching elements Q3, Q4. V-phase arm 16 includes switching elements Q5, Q6. W-phase arm 17 includes switching elements Q7, Q8. Further, anti-parallel diodes D3-D8 are connected to switching elements Q3-Q8 respectively. Turning on/off switching elements Q3-Q8 is controlled by means of switching control signals S3-S8 supplied from control device 3000.

The phase arms have intermediate points respectively connected to phase ends of corresponding phase coils of alternating-current motor M1. Typically, alternating-current motor M1 is a three-phase permanent magnet motor, and is configured to have three coils of the U, V, W phases, each having one end connected to a neutral point commonly. Each of the phase coils has the other end connected to the intermediate point of the switching elements of each of phase arms 15-17.

In a step-up operation, converter 12 steps up a direct-current voltage Vb supplied from direct-current power source B to obtain a direct-current voltage VH, which corresponds to a voltage input to inverter 14 and is hereinafter also referred to as "system voltage", and supplies it to inverter 14. More specifically, in response to switching control signals S1, S2 from control device 3000, the on period of switching element Q1 and the on period of switching element Q2 are provided to come alternately. A step-up ratio is in accordance with the ratio of these on periods.

On the other hand, in a step-down operation, converter 12 steps down direct-current voltage VH (system voltage) supplied from inverter 14 via smoothing capacitor C0 to charge direct-current power source B. More specifically, in response to switching control signals S1, S2 from control device 3000, a period during which only switching element Q1 is on, and a period during which both switching elements Q1, Q2 are off are provided to come alternately. A step-down ratio is in accordance with the duty ratio of the foregoing on period. Instead of the period during which both switching elements Q1, Q2 are off, a period during which only switching element Q2 is turned on may be provided to correspond to the on period of anti-parallel diode D2. In this case, switching elements Q1, Q2 complementarily becomes on and off repeatedly in principle.

Smoothing capacitor C0 smoothes the direct-current voltage supplied from converter 12, and supplies the smoothed direct-current voltage to inverter 14. A voltage sensor 13 detects the voltage across smoothing capacitor C0, i.e., the system voltage, and provides detected value VH thereof to control device 3000.

In response to switching control signals S3-S8 from control device 3000, inverter 14 causes switching of switching elements Q3-Q8. Inverter 14 is supplied with direct-current voltage VH from smoothing capacitor C0.

When a torque command value for alternating-current motor M1 has a positive value (Trqcom>0), inverter 14 converts the direct-current voltage into an alternating-current voltage by means of switching of switching elements Q3-Q8 and drives alternating-current motor M1 to output a positive torque.

Meanwhile, when the torque command value for alternating-current motor M1 has a value of 0 (Trqcom=0), inverter 14 converts the direct-current voltage into an alternating-current voltage by means of switching of switching elements Q3-Q8 and drives alternating-current motor M1 to obtain a torque of 0.

By controlling in this way, alternating-current motor M1 is driven to generate a torque of 0 or of a positive value as designated by torque command value Trqcom.

Furthermore, upon regenerative braking of the vehicle having motor driving system 100 mounted thereon, torque command value Trqcom of alternating-current motor M1 is set to a negative value (Trqcom<0). In this case, inverter 14 converts, by means of switching of switching elements Q3-Q8, an alternating-current voltage generated by alternating-current motor M1 into direct-current voltage VH, and supplies direct-current voltage VH (system voltage) thus converted, to converter 12 via smoothing capacitor C0.

It should be noted that the term "regenerative braking" as described herein includes: braking involving regenerative power generation resulting from manipulation of the foot brake pedal by a driver who drives the vehicle; and vehicular speed reduction (or stop of acceleration) involving regenerative power generation achieved by easing off the accelerator pedal during traveling without manipulating the foot brake pedal.

Current sensors 24 detect motor currents flowing in alternating-current motor M1, and notify control device 3000 of the detected motor currents. The sum of the instantaneous values of three phase currents iu, iv, iw is zero. Hence, it is sufficient to dispose current sensors 24 to detect motor currents for two phases (for example, V-phase current iv and W-phase current iw) as shown in FIG. 1.

A rotational angle sensor (resolver) 25 detects a rotational angle θ of a rotor of alternating-current motor M1 and a rotation speed (motor rotation speed) N per unit time of alternating-current motor M1, and sends a signal indicating a result of the detection to control device 3000.

An accelerator pedal position sensor 26 detects an accelerator pedal position ACC representing an amount of operation on an accelerator pedal (not shown), and informs control device 3000 of accelerator pedal position ACC thus detected.

An eco switch 27 detects which traveling mode the driver has selected out of a normal mode and a saving mode, and sends a signal indicating a result of the detection to control device 3000. It should be noted that the normal mode refers to a mode oriented to operation responsiveness of the vehicle rather than improvement of energy efficiency. It should be also noted that the saving mode refers to a mode oriented to the improvement of energy efficiency rather than the operation responsiveness of the vehicle. The driver switches eco switch 27 between these traveling modes, thus achieving improved energy efficiency without decreasing travel performance of the vehicle.

Control device 3000 determines torque command value Trqcom based on accelerator pedal position ACC. Based on battery voltage Vb detected by voltage sensor 10, system voltage VH detected by voltage sensor 13, motor currents iv, iw detected by current sensors 24, rotational angle θ detected by resolver 25, and the result of detection for eco switch 27, control device 3000 controls converter 12 and inverter 14 to cause alternating-current motor M1 to output a torque in accordance with torque command value Trqcom.

Control device 3000 generates switching control signals S1-S8 to control converter 12 and inverter 14 in the manner described above, and sends them to converter 12 and inverter 14.

In the step-up operation of converter 12, control device 3000 controls output current (system voltage) VH of smoothing capacitor C0 through feedback to generate switching control signals S1, S2 so that system voltage VH has a value equal to a system voltage command value VHcom.

Control device 3000 changes system voltage command value VHcom in accordance with the result of detection for eco switch 27 (whether the normal mode or the saving mode is selected).

When the normal mode is selected, control device 3000 sets system voltage command value VHcom at a step-up upper limit value VH(MAX) of converter 12 (for example, approximately 650 volts). In this way, system voltage VH is at VH(MAX).

On the other hand, when the saving mode is selected, control device 3000 restricts system voltage VH. Specifically, control device 3000 sets system voltage command value VHcom at a voltage value VH(1) (for example approximately 500 volts) smaller than VH(MAX). In this way, system voltage VH is at VH(1), thereby reducing power loss in converter 12 during the saving mode as compared with that during the normal mode.

Figure 2:
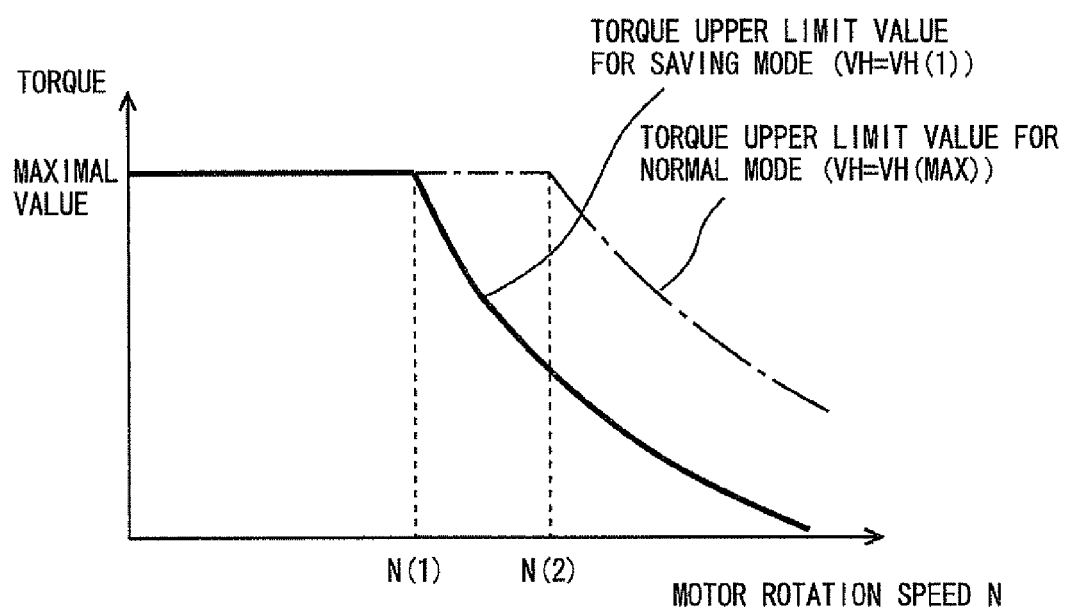
FIG. 2 shows a relation among a motor rotation speed, a system voltage, and a torque upper limit value of an alternating-current motor.

Referring to FIG. 2, a relation will be described among motor rotation speed N, system voltage VH, and the torque upper limit value (maximal torque that can be output) of alternating-current motor M1.

As the rotation speed and/or the output torque are increased, alternating-current motor M1 has an increased induced voltage and requires a higher voltage. The maximal value of the motor required voltage (induced voltage) is determined by system voltage VH. Hence, as system voltage VH is smaller or motor rotation speed N is higher, the torque upper limit value of alternating-current motor M1 is smaller.

In the saving mode (system voltage VH=VH(1)), the torque upper limit value of alternating-current motor M1 remains at the maximal value in a range of N<N(1) as indicated by the solid line of FIG. 2, but is decreased more in a range of N>N(1) as motor rotation speed N is higher.

In the normal mode (system voltage VH=VH(MAX)), the torque upper limit value of alternating-current motor M1 remains at the maximal value as in the saving mode in a range of N<N(2) (N(2)>N(1)) as shown in a dashed line of FIG. 2, and is decreased more in a range of N>N(2) as motor rotation speed N is higher.

When stepping up system voltage VH from VH(1) to VH(MAX), the torque upper limit value of alternating-current motor M1 is increased from the value indicated by the solid line of FIG. 2 to a value indicated by a dotted line of FIG. 2. When stepping down system voltage VH from VH(MAX) to VH(1), the torque upper limit value of alternating-current motor M1 is decreased from the value indicated by the dotted line of FIG. 2 to the value indicated by the solid line Of FIG. 2.

Figure 4:
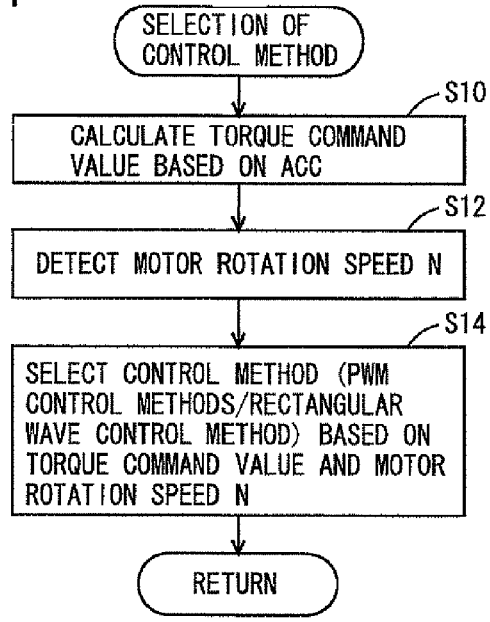
FIG. 4 is a flowchart illustrating how to select a control method.
Figure 5:
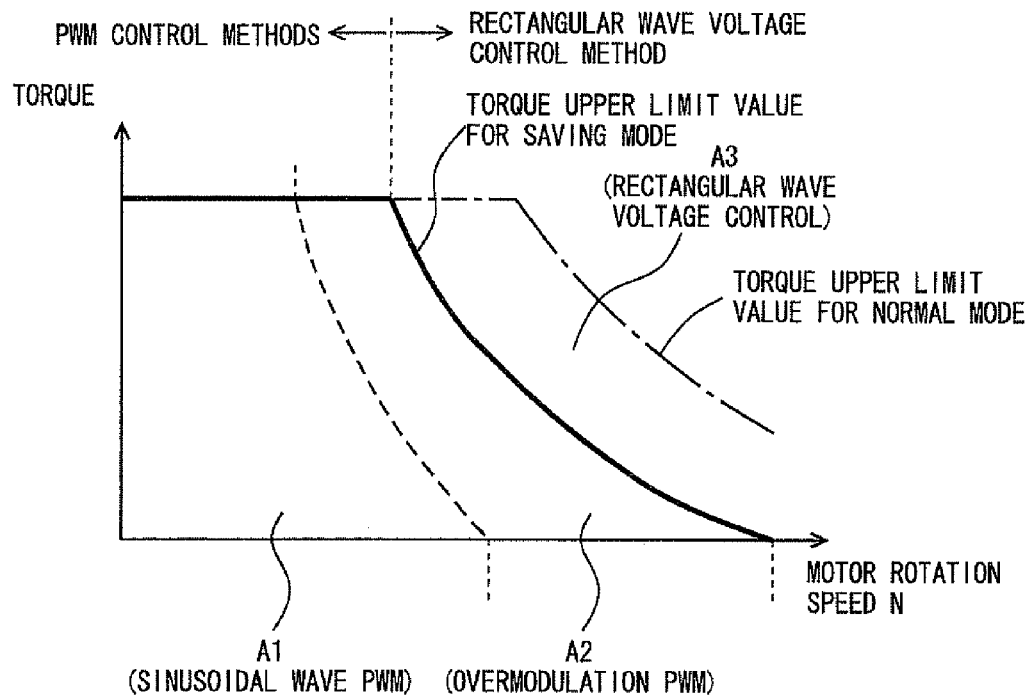
FIG. 5 illustrates how the control methods are changed over in accordance with a motor condition.

Referring to FIGS. 3-5, power conversion performed by inverter 14 under control of control device 3000 will be described.

FIG. 3 illustrates control methods for inverter 14 used in motor driving system 100. It should be noted that FIG. 3 shows numerical values for a modulation factor just for illustration and the numerical values therefor are not limited to these.

As shown in FIG. 3, motor driving system 100 employs three control modes, which are to be changed over for voltage conversion in inverter 14. Specifically, the three control modes are a sinusoidal wave PWM control mode, an overmodulation PWM control mode, and a rectangular wave voltage control mode.

The sinusoidal wave PWM control is utilized as a general PWM control method, and is to control the switching elements of each of the phase arms to become on/off in accordance with a comparison in voltage between a sinusoidal-wave voltage command value and a carrier wave (typically, a triangular wave). As a result, for a set of the high level period corresponding to the on period of each of the upper arm elements and the low level period corresponding to the on period of each of the lower arm elements, a duty ratio is controlled to cause a fundamental wave component thereof to be a sinusoidal wave during a fixed period of time. As known well, the sinusoidal wave PWM control is only capable of increasing the amplitude of the fundamental wave component up to 0.61 times as large as that of the voltage input to the inverter.

On the other hand, in the rectangular wave voltage control, the alternating-current motor is fed with one pulse of a rectangular wave in which the ratio of the high level period and the low level period is 1:1. Such a rectangular wave is obtained by maintaining the PWM duty at its maximal value during the above-described fixed period of time. This increases the modulation factor up to 0.78.

The overmodulation PWM control is to perform PWM control similar to the sinusoidal wave PWM control, with the fundamental wave component being distorted to reduce the amplitude of the carrier wave. Such distortion of the fundamental wave component results in a modulation factor increased up to a range of 0.61-0.78. In the present embodiment, the sinusoidal wave PWM control, which is a normal PWM control method, and the overmodulation PWM control are each classified as a "PWM control method".

FIG. 4 is a flowchart illustrating how to select a control method for inverter 14. As shown in the flowchart of FIG. 4, control device 3000 calculates torque command value Trqcom of alternating-current motor M1 based on accelerator pedal position ACC (step 10; hereinafter, the word "step" is abbreviated as "S"), detects motor rotation speed N (S12), and selects one of a rectangular wave voltage control method and the PWM control methods (sinusoidal wave PWM method/overmodulation PWM control method) for control of the motor, based on torque command value Trqcom and motor rotation speed N (S14).

Specifically, control device 3000 determines which one of a low rotation speed region A1, a middle rotation speed region A2, and a high rotation speed region A3 in a map shown in FIG. 5 an intersection point of torque command value Trqcom and motor rotation speed N (hereinafter, also referred to as "command operating point") is in. When the command operating point is in low rotation speed region A1, control device 3000 selects the sinusoidal wave PWM control in order to reduce fluctuation of the torque. When the command operating point is in middle rotation speed region A2, control device 3000 selects the overmodulation PWM control. When the command operating point is in high rotation speed region A3, control device 3000 selects the rectangular wave voltage control.

Particularly, by selecting the overmodulation PWM control and the rectangular wave voltage control, an improved output of alternating-current motor M1 is realized. As such, which one of the control modes shown in FIG. 2 is used is determined in consideration of a range of an implementable modulation factor.

As apparent from FIG. 5, when stepping up system voltage VH from VH(1) to VH(MAX), the command operating point is in high rotation speed region A3 and the rectangular wave voltage control is accordingly selected as a control method for inverter 14.

It should be noted that the selection of a control method for inverter 14 may be performed based on an intersection point of a torque estimation value Trq and motor rotation speed N of alternating-current motor M1 (hereinafter, also referred to as "actual operating point") in the map shown in FIG. 5 instead of the above-described command operating point. Details of torque estimation value Trq will be described later.

In motor driving system 100 configured as above, even when the saving mode is selected, control device 3000 lifts the restriction on system voltage VH for the saving mode based on accelerator pedal position ACC and the actual operating point.

When lifting the restriction on system voltage VH and increasing system voltage command value VHcom, control device 3000 controls (cooperatively controls) to increase system voltage command value VHcom and torque command value Trqcom in a cooperative manner.

Figure 6:
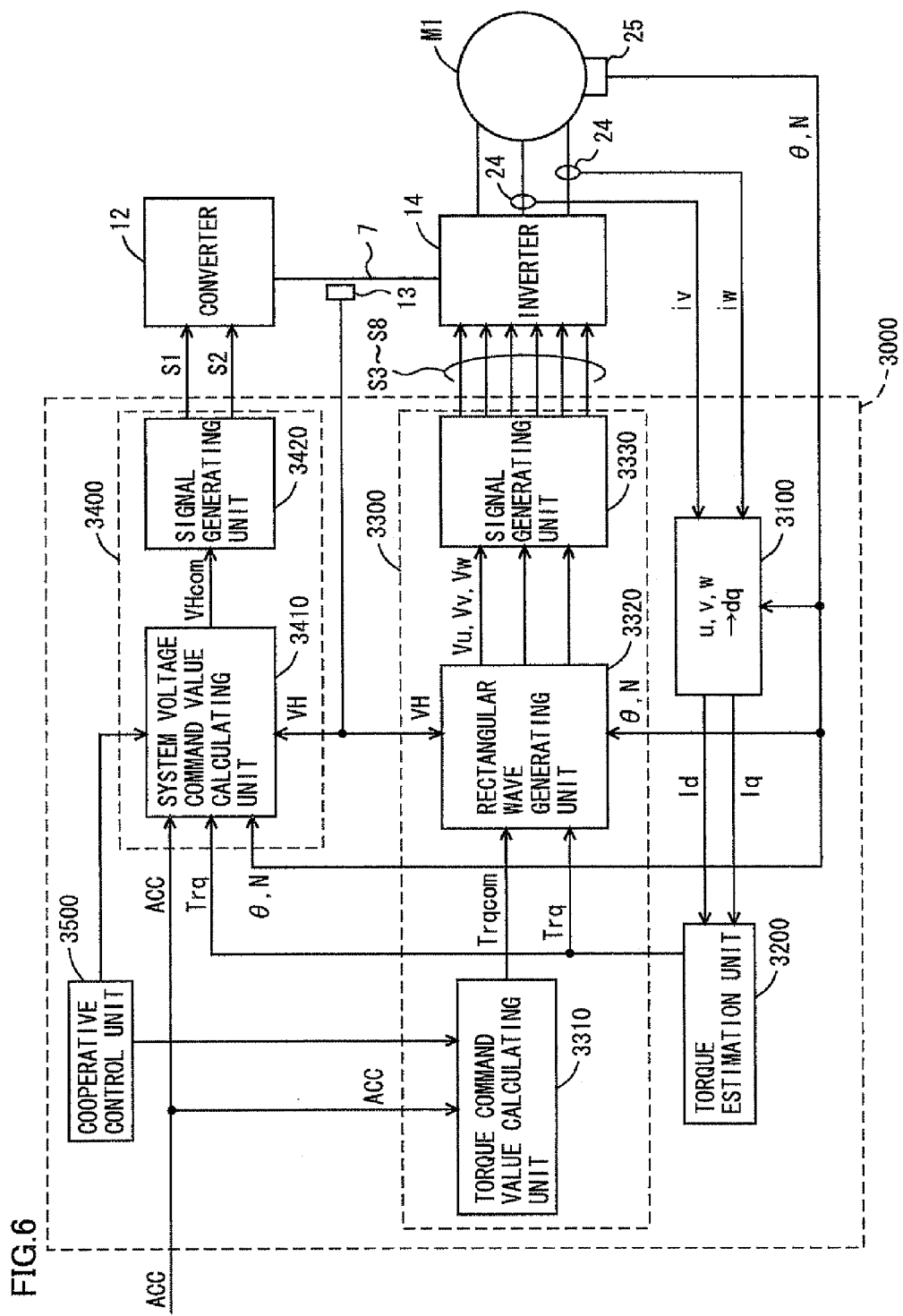
FIG. 6 is a functional block diagram of a control device according to the first embodiment of the present invention.

FIG. 6 shows a functional block diagram of control device 3000 controlling converter 12 while controlling inverter 14 by the rectangular wave voltage control in the saving mode.

Control device 3000 includes a coordinate converting unit 3100, a torque estimation unit 3200, a rectangular voltage control unit 3300, a system voltage control unit 3400, and a cooperative control unit 3500.

Coordinate conversion unit 3100 employs rotational angle θ detected by resolver 25 for coordinate conversion (three phases→two phases), to calculate a d-axis current Id and a q-axis current Iq based on V-phase current iv and W-phase current iw detected by current sensors 24.

Torque estimation unit 3200 uses d-axis current Id and q-axis current Iq calculated by coordinate conversion units 3100, to estimate the output torque of alternating-current motor M1 as torque estimation value Trq. Torque estimation unit 3200 is constituted by, for example, a torque calculation map for outputting torque estimation value Trq with d-axis current Id and q-axis current Iq being arguments. It should be noted that torque estimation value Trq is a value calculated based on the values detected by resolver 25 and current sensors 24, and is very close to the actual output torque of alternating-current motor M1.

Rectangular voltage control unit 3300 includes a torque command value calculating unit 3310, a rectangular wave generating unit 3320, and a signal generating unit 3330.

Torque command value calculating unit 3310 normally calculates torque command value Trqcom in accordance with accelerator pedal position ACC. However, when receiving a signal from cooperative control unit 3500, torque command value calculating unit 3310 calculates torque command value Trqcom in accordance with not only accelerator pedal position ACC but also the signal from cooperative control unit 3500.

Rectangular wave generating unit 3320 generates phase voltage command values (rectangular wave pulses) Vu, Vv, Vw based on torque command value Trqcom, torque estimation value Trq, rotational angle θ (motor rotation speed N), and system voltage command value VHcom (system voltage VH). Rectangular wave generating unit 3320 controls torque command value Trqcom using torque estimation value Trq through feedback to restrain a phenomenon of deviation of torque (phenomenon that the actual output torque of alternating-current motor M1 and torque command value Trqcom are greatly different from each other). Specifically, rectangular wave generating unit 3320 finds a control deviation based on deviation ΔTrq of torque estimation value Trq relative to torque command value Trqcom (ΔTrq=Trqcom−Trq), and sets a rectangular wave pulse in accordance with the control deviation thus found, rotational angle θ, and system voltage command value VHcom (system voltage VH).

In accordance with phase voltage command values Vu, Vv, Vw, signal generating unit 3330 generates switching control signals S3-S8. In accordance with switching control signals S3-S8, inverter 14 operates to switch, thereby applying to the motor voltages designated by the rectangular wave pulses. In this way, the output torque of alternating-current motor M1 has a value corresponding to torque command value Trqcom.

Figure 7:
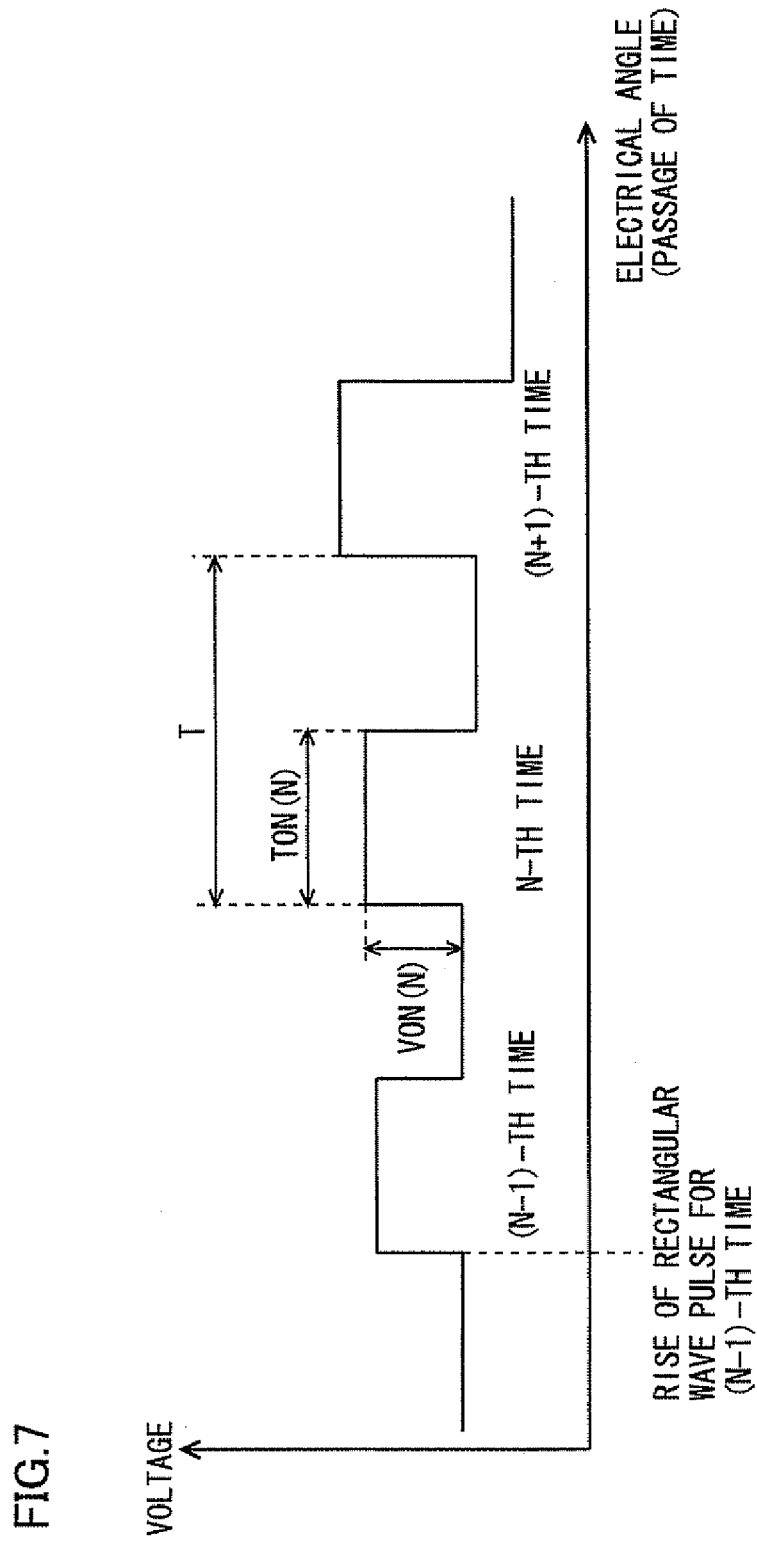
FIG. 7 shows one exemplary waveform of a rectangular wave pulse in rectangular wave voltage control.

FIG. 7 shows one exemplary waveform of a rectangular wave pulse provided to switching element Q3 of U-phase arm 15. A voltage command value VON(N) in the case of turning on switching element Q3 for the N-th time (N is a natural number) is set at a value corresponding to system voltage command value VHcom (or system voltage VH) obtained when switching element Q3 was turned on for the (N−1)-th time (i.e., when the rectangular wave pulse was raised for the (N−1)-th time). Further, an on period TON(N) in the case of turning on switching element Q3 for the N-th time is set to have a length corresponding to system voltage command value VHcom (or system voltage VH) and torque command value Trqcom obtained upon turning on switching element Q3 for the (N−1)-th time.

It should be noted that the horizontal axis of FIG. 7 represents an electrical angle corresponding to passage of time, and the electrical angle is determined based on rotational angle θ of the rotor. It should be also noted that in the rectangular wave voltage control, only one switching is performed for each cycle of the electrical angle. Hence, a switching cycle T (a period of time from a rise of the rectangular wave pulse to the next rise thereof) and on period TON are longer as the speed of change in rotational angle θ of the rotor (motor rotation speed N) is slower.

Referring to FIG. 6 again, system voltage control unit 3400 includes a system voltage command value calculating unit 3410, and a signal generating unit 3420.

Normally in the saving mode, system voltage command value calculating unit 3410 restricts system voltage command value VHcom to VH(1). However, based on accelerator pedal position ACC and the actual operating point determined from torque estimation value Trq and motor rotation speed N, system voltage command value calculating unit 3410 lifts the restriction on system voltage VH to increase system voltage command value VHcom from VH(1) to VH(MAX).

In accordance with system voltage command value VHcom, signal generating unit 3420 generates switching control signals S1, S2. Converter 12 operates to switch in accordance with switching control signals S1, S2 to allow system voltage VH to be a voltage as designated by system voltage command value VHcom.

In the case where the control method for inverter 14 is the rectangular wave voltage control when system voltage command value calculating unit 3410 increases system voltage command value VHcom from VH(1) to VH(MAX), cooperative control unit 3500 controls system voltage command value VHcom and torque command value Trqcom to increase, cooperatively.

It should be noted that in the present embodiment, when increasing system voltage command value VHcom from VH(1) to VH(MAX), the control method for inverter 14 is always the rectangular wave voltage control as described above and the control of cooperative control unit 3500 is therefore performed always.

Figure 8:
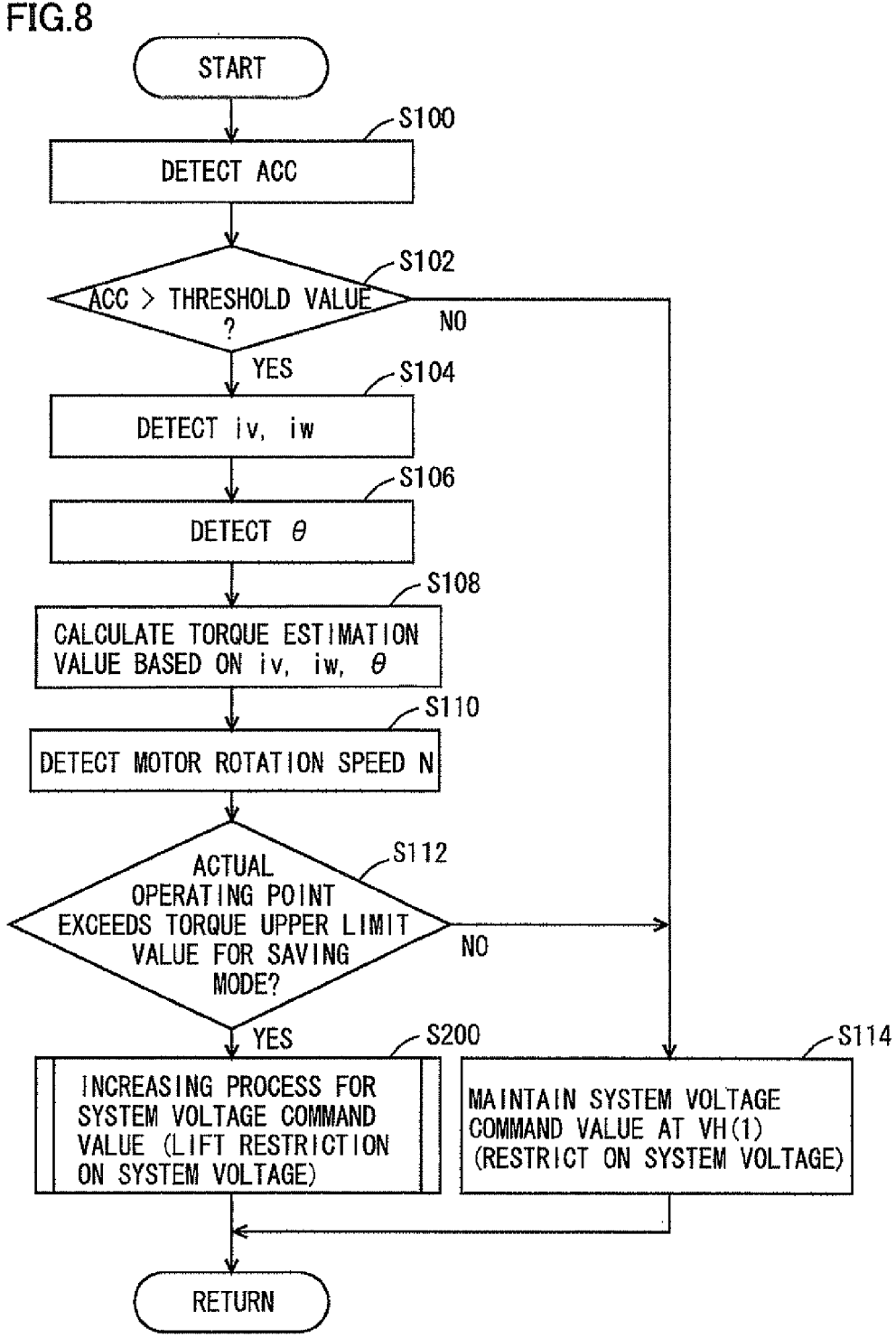
FIG. 8 is a first flowchart showing a control structure of the control device according to the first embodiment of the present invention.

Referring to FIG. 8, a control structure of a program executed by control device 3000 will be described. The program is repeatedly executed for a predetermined cycle time in the saving mode when system voltage VH is restricted to VH(1).

In S100, control device 3000 detects accelerator pedal position ACC. In S102, control device 3000 determines whether or not accelerator pedal position ACC is larger than a threshold value. The threshold value is a value for determining whether or not the driver requests urgent acceleration of the vehicle (increase of torque), and is for example, a value of approximately 85% assuming that a value at full throttle for acceleration is 100%. When accelerator pedal position ACC is larger than the threshold value (YES in S102), the process goes to S104. Otherwise (NO in S102), the process goes to S114.

In S104, control device 3000 detects V-phase current iv and W-phase current iw by means of current sensors 24. In S106, control device 3000 detects rotational angle θ of the rotor of alternating-current motor M1.

In S108, based on V-phase current iv, W-phase current iw, and rotational angle θ, control device 3000 calculates torque estimation value Trq. This process corresponds to torque estimation unit 3200 in the above-described functional block diagram. In S110, control device 3000 detects motor rotation speed N.

In S112, control device 3000 determines whether or not the actual operating point, which is the intersection point of torque estimation value Trq and motor rotation speed N, has reached the torque upper limit value (solid line in FIG. 2) for the saving mode in the map shown in FIG. 2. In other words, control device 3000 determines whether or not torque estimation value Trq has reached the torque upper limit value for the saving mode when the motor rotation speed is N. It should be noted that torque estimation value Trq is very close to the actual output torque of alternating-current motor M1 as described above. When the actual operating point reaches the torque upper limit value in the saving mode (YES in S112), the process goes to S200. Otherwise (NO in S112), the process goes to S114.

In S200, control device 3000 lifts the restriction on system voltage VH and performs increasing process for system voltage command value VHcom in order to increase system voltage VH from VH(1) to VH(MAX). This process will be described in detail with reference to FIG. 9.

In S114, control device 3000 maintains system voltage command value VHcom at VH(1) to maintain the restriction on system voltage VH.

Figure 9:
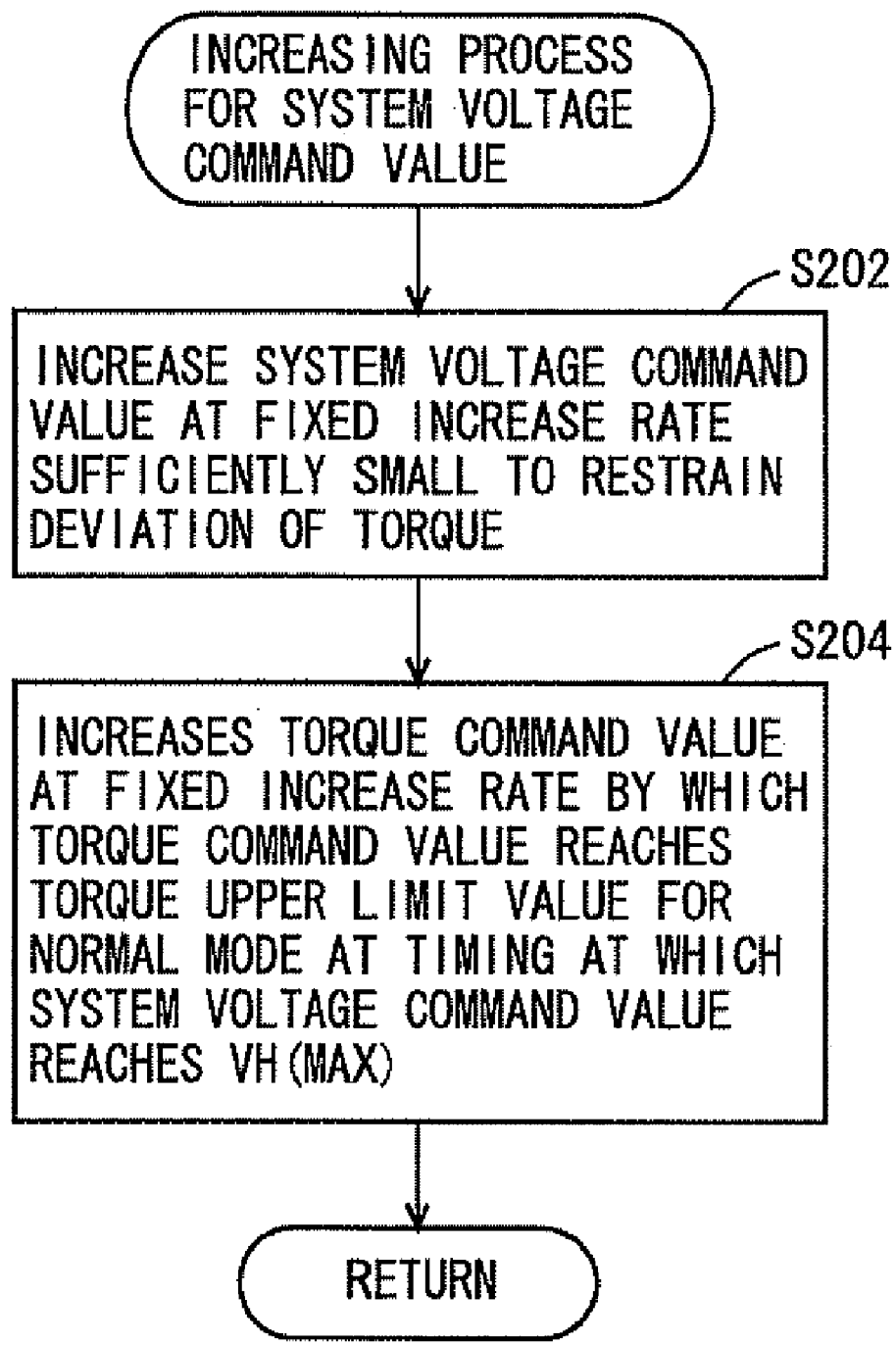
FIG. 9 is a second flowchart showing a control structure of the control device according to the first embodiment of the present invention.

Referring to FIG. 9, the following describes a control structure of a program executed by control device 3000 in S200 of FIG. 8 to perform the increasing process for system voltage command value VHcom. In the increasing process, control device 3000 cooperatively controls system voltage command value VHcom and torque command value Trqcom.

In S202, even when control device 3000 simultaneously increases torque command value Trqcom and system voltage command value VHcom, system voltage command value VHcom is increased at a fixed increase rate (amount of increase per unit time) sufficiently small to restrain the deviation of torque.

In S204, control device 3000 increases torque command value Trqcom at a fixed increase rate by which torque command value Trqcom reaches the torque upper limit value (dotted line of FIG. 2) for the normal mode at a timing at which system voltage command value VHcom reaches VH(MAX).

Figure 10:
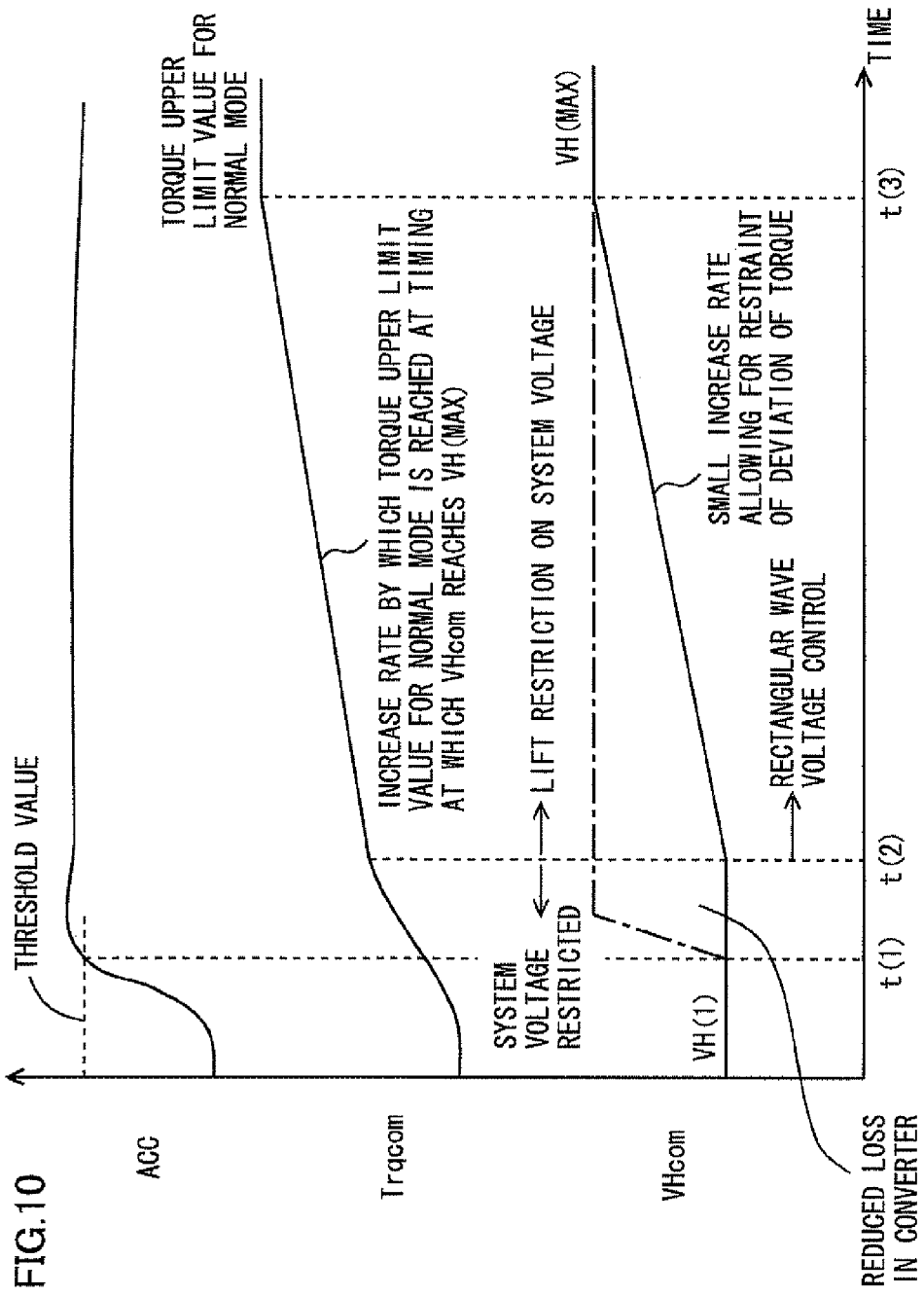
FIG. 10 is a timing chart of a system voltage command value and a torque command value, each of which is controlled by the control device according to the first embodiment of the present invention.
Figure 11:
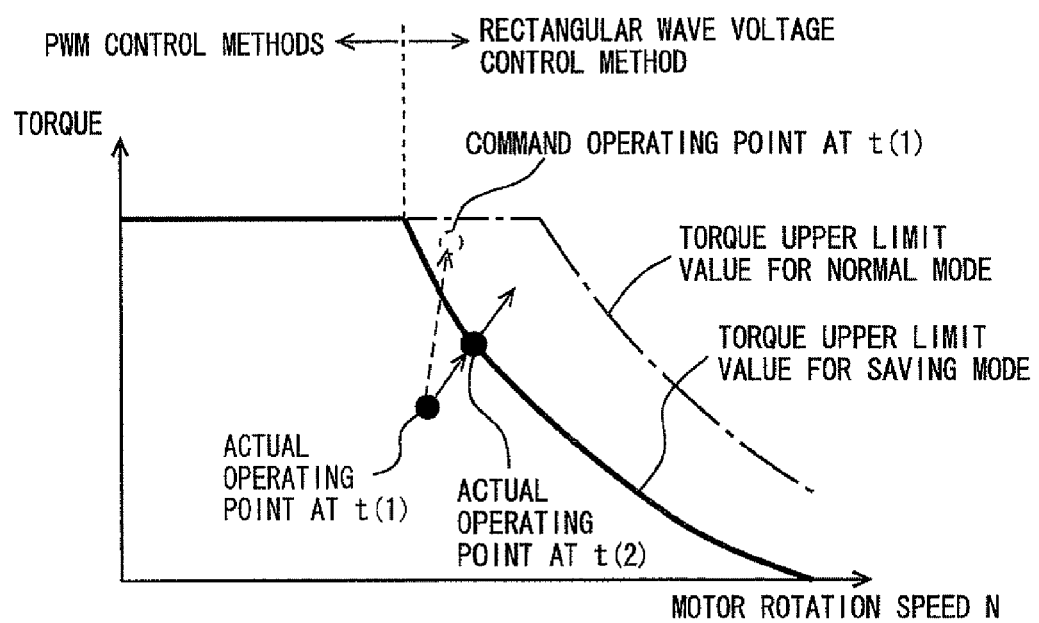
FIG. 11 shows how an actual operating point, which is determined by a torque estimation value and the motor rotation speed, is moved.
Figure 12:
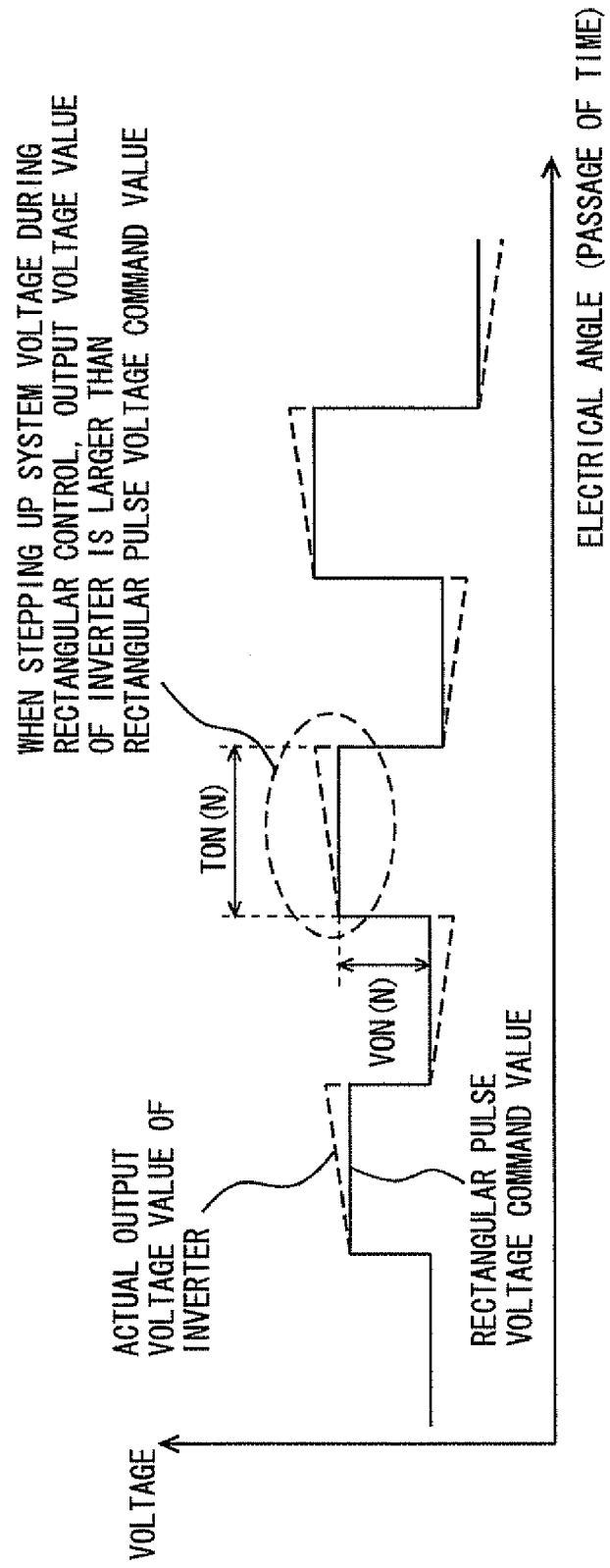
FIG. 12 is a first diagram showing an output voltage of an inverter and a voltage command value in the rectangular wave pulse.

The following describes how control device 3000 according to the present embodiment operates based on the above-described structures and flowcharts, with reference to FIGS. 10-12.

In the description below, it is assumed that the driver drives the vehicle in the saving mode with system voltage VH being restricted to VH(1).

As shown in FIG. 10, when the driver strongly presses down on the accelerator pedal to cause accelerator pedal position ACC to reach the threshold value at time t(1) (YES in S102), torque estimation value Trq is calculated based on V-phase current iv, W-phase current iw, and rotational angle θ of the rotor (S104-S108).

Then, in the map shown in FIG. 2, it is determined whether or not the actual operating point determined by torque estimation value Trq and motor rotation speed N has reached the torque upper limit value for the saving mode (S112).

On this occasion, as shown in FIG. 11, torque command value Trqcom is increased according to the increase of accelerator pedal position ACC and the command operating point at time t(1) is accordingly within a region exceeding the torque upper limit value for the saving mode.

However, the actual operating point at time t(1) is within a region not exceeding the torque upper limit value for the saving mode, and reaches the torque upper limit value for the saving mode at time t(2) coming thereafter. In other words, torque estimation value Trq is very close to the actual output torque of alternating-current motor M1 and is increased with a lag behind the increase of torque command value Trqcom. Hence, torque estimation value Trq reaches the torque upper limit value for the saving mode, not at time t(1) but at time t(2) coming thereafter. Hence, until time t(2), the increase of the actual output torque is never restricted even though system voltage VH is restricted to VH(1).

Accordingly, as shown in FIG. 10, until the actual operating point rather than the command operating point reaches the torque upper limit value for the saving mode (NO in S112), the restriction on system voltage VH is maintained (S114). In this way, as compared with a case where the restriction on system voltage VH is lifted at time t(1) (see the dashed line of FIG. 10), loss of electric power can be reduced in converter 12 while generating driving force as requested by the driver.

When the actual operating point reaches the torque upper limit value for the saving mode at time t(2) (YES in S112), the restriction on system voltage VH is lifted (S200).

When increasing system voltage command value VHcom from VH(1) to VH(MAX) after the restriction of system voltage VH is lifted at time t(2), the control method for inverter 14 is always the rectangular wave voltage control as described above.

In the rectangular wave voltage control, only one switching is performed for each cycle of the electrical angle as described above and one on period TON is therefore longer than that of the PWM control.

When stepping up system voltage VH during such rectangular wave voltage control, system voltage VH (output voltage of smoothing capacitor C0) increased is provided to inverter 14 via smoothing capacitor C0 during one on period TON. This causes a deviation between the output voltage of inverter 14 (voltage sent from inverter 14 to alternating-current motor M1) and voltage command value VON in the rectangular wave pulse as shown in FIG. 12. An amount of this deviation is larger as the increase rate of system voltage command value VHcom is larger or as on period TON of the rectangular wave pulse is longer.

If torque command value Trqcom and system voltage command value VHcom are simultaneously increased with a large amount of change (for example maximal rate) in this state, torque estimation value Trq cannot follow torque command value Trqcom through feedback control, which may result in the phenomenon of deviation of torque.

In view of this, as shown in FIG. 10, system voltage command value VHcom is increased at the increase rate sufficiently small to restrain the deviation of torque (S202). In this way, the amount of deviation is small between the output voltage of inverter 14 and voltage command value VON in the rectangular wave pulse.

Further, torque command value Trqcom is increased at the fixed increase rate by which torque command value Trqcom reaches the torque upper limit value for the normal mode (dotted line in FIG. 2) at a timing at which system voltage command value VHcom reaches VH(MAX) (S204).

In this way, the deviation between voltage command value VON in the rectangular wave pulse and the output voltage of inverter 14 can be restrained to the minimum, thereby restraining the deviation of torque. This also never makes the driver feel uncomfortable about abrupt increase of torque.

As such, in the control device according to the present embodiment, when lifting the restriction on the system voltage for the saving mode and increasing the system voltage, system voltage command value VHcom is increased at the increase rate sufficiently small to restrain the deviation of torque and torque command value Trqcom is increased at the fixed increase rate corresponding to the increase rate of system voltage command value VHcom, in consideration of the fact that the inverter is controlled by the rectangular wave voltage control. In this way, the deviation between the voltage command value in the rectangular wave pulse and the output voltage of the inverter can be restrained to the minimum. Thus, the deviation of torque can be restrained.

In the present embodiment, the condition of lifting the restriction on the system voltage (S200) is such that accelerator pedal position ACC is larger than the threshold value (YES in S102) and the actual operating point has reached the torque upper limit value for the saving mode (YES in S112), but the condition of lifting the restriction on the system voltage is not limited to this. For example, the restriction on system voltage VH may be lifted when accelerator pedal position ACC has become larger than the threshold value irrespective of whether or not the actual operating point has reached the torque upper limit value for the saving mode. In this way, when the driver requests urgent increase of torque, the lifting of the restriction on the system voltage and the increase of the system voltage can be started quickly in favor of increased torque rather than reduced power loss in the converter.

Second Embodiment

Hereinafter, a control device according to a second embodiment of the present invention will be described. It should be noted that the control device according to the present embodiment performs the increasing process for system voltage command value VHcom (cooperative control for system voltage command value VHcom and torque command value Trqcom) in a way different from the process (S200 in FIG. 8 and the process in FIG. 9) performed by the control device according to the first embodiment. Processes other than this are the same as those in the first embodiment. Hence, detailed explanation is not repeated here for the same control block diagrams and flowcharts as those of the control device of the first embodiment.

Figure 13:
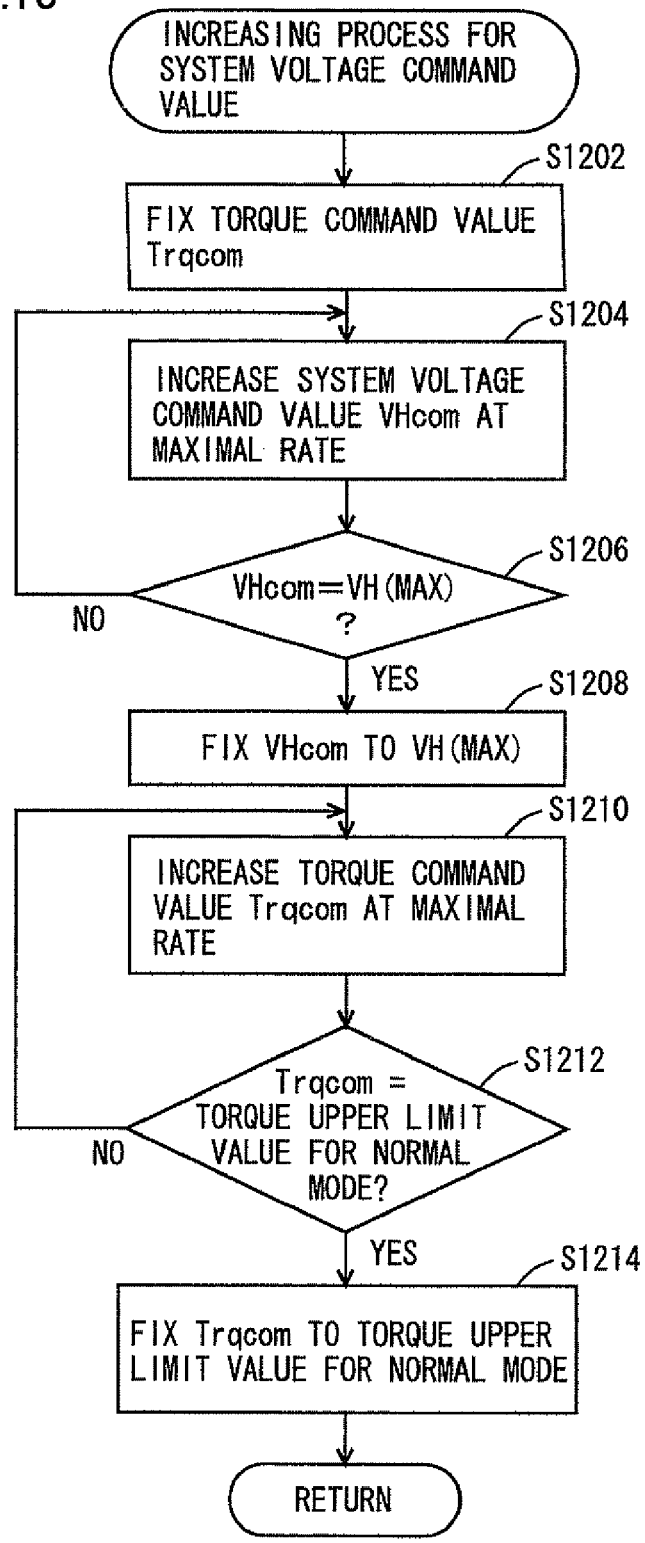
FIG. 13 is a flowchart showing a control structure of a control device according to a second embodiment of the present invention.

Referring to FIG. 13, the following describes a control structure of a program executed when control device 3000 according to the present embodiment performs the increasing process for system voltage command value VHcom (cooperative control for system voltage command value VHcom and torque command value Trqcom).

In S1202, control device 3000 fixes torque command value Trqcom. In S1204, control device 3000 increases system voltage command value VHcom at a maximal rate.

In S1206, control device 3000 determines whether or not system voltage command value VHcom has reached VH(MAX). When it has reached VH(MAX) (YES in S1206), the process goes to S1208. Otherwise (NO in S1206), the process goes back to S1204.

In S1208, control device 3000 fixes system voltage command value VHcom to VH(MAX).

In S1210, control device 3000 increases torque command value Trqcom at a maximal rate. It should be noted that the maximal rate herein is a maximal rate for increasing torque command value Trqcom and has a value different from that of the maximal rate for system voltage command value VHcom.

In S1212, control device 3000 determines whether or not torque command value Trqcom has reached the torque upper limit value for the normal mode (dotted line in FIG. 2). When it has reached the torque upper limit value for the normal mode (YES in S1212), the process goes back to S1214. Otherwise (NO in S1212), the process goes back to S1210.

In S1214, control device 3000 fixes torque command value Trqcom to the torque upper limit value for the normal mode.

Figure 14:
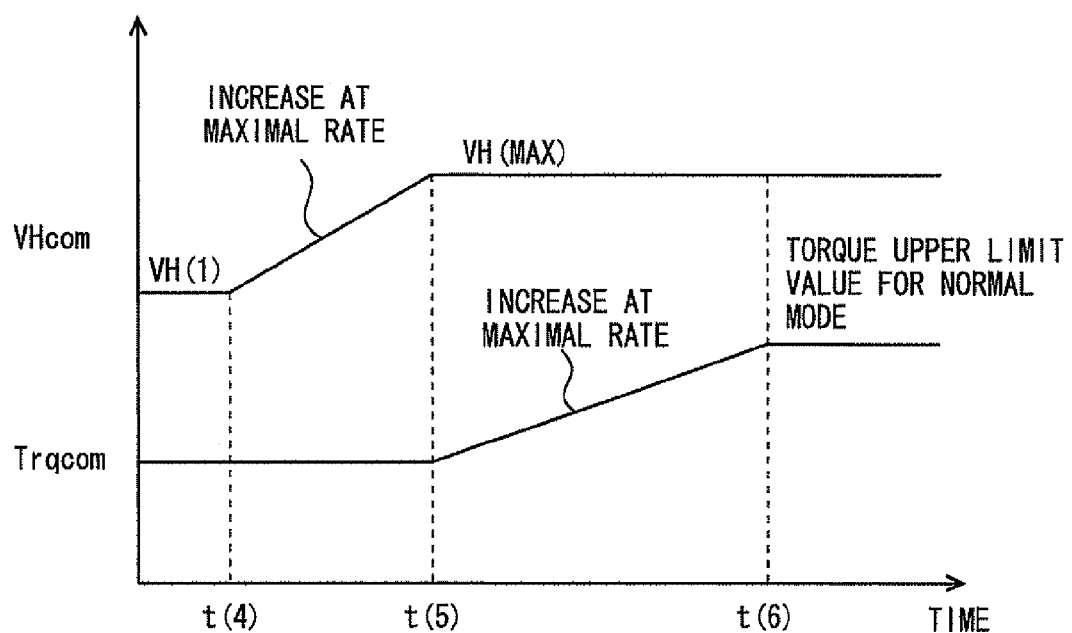
FIG. 14 is a timing chart of a system voltage command value and a torque command value, each of which is controlled by the control device according to the second embodiment of the present invention.

Referring to FIG. 14, the following describes how system voltage command value VHcom and torque command value Trqcom, which are controlled by control device 3000 according to the present embodiment based on the flowchart of the above-described structure, are changed with passage of time.

As described in the first embodiment, since the inverter is controlled by the rectangular wave voltage control when lifting the restriction on the system voltage for the saving mode, the phenomenon of deviation of torque may take place if torque command value Trqcom and system voltage command value VHcom are simultaneously increased at the maximal rates.

In view of this, when the actual operating point reaches the torque upper limit value for the saving mode at time t(4) as shown in FIG. 14 (YES in S112), torque command value Trqcom is fixed (S1202) and system voltage command value VHcom is increased at the maximal rate (S1204).

When system voltage command value VHcom reaches VH(MAX) at time t(5) (YES in S1206), system voltage command value VHcom is fixed to VH(MAX) (S1208) and torque command value Trqcom is increased at the maximal rate (S1210).

When torque command value Trqcom reaches the torque upper limit value for the normal mode at time t(6) (YES in S1212), torque command value Trqcom is fixed to the torque upper limit value for the normal mode (S1214).

As such, in the control device according to the present embodiment, when lifting the restriction on the system voltage for the saving mode and increasing the system voltage, system voltage command value VHcom is first increased at the maximal rate with torque command value Trqcom being fixed, in consideration of the fact that the inverter is controlled by the rectangular wave voltage control. In this way, system voltage VH can be increased quickly to VH(MAX) and deviation of torque can be restrained while increasing system voltage VH. When system voltage command value VHcom has reached VH(MAX), torque command value Trqcom is increased at the maximal rate with system voltage command value VHcom being fixed to VH(MAX). In this way, the output torque of the motor can be quickly increased to the torque upper limit value for the normal mode, and deviation of torque can be restrained while increasing the output torque of the motor.

Third Embodiment

Hereinafter, a control device according to a third embodiment of the present invention will be described. It should be noted that the control device according to the present embodiment performs the increasing process for system voltage command value VHcom (cooperative control for system voltage command value VHcom and torque command value Trqcom) in a way different from the process (S200 in FIG. 8 and the process in FIG. 9) performed by the control device according to the first embodiment. Processes other than this are the same as those in the first embodiment. Hence, detailed explanation is not repeated here for the same control block diagrams and flowcharts as those of the control device of the first embodiment.

Figure 15:
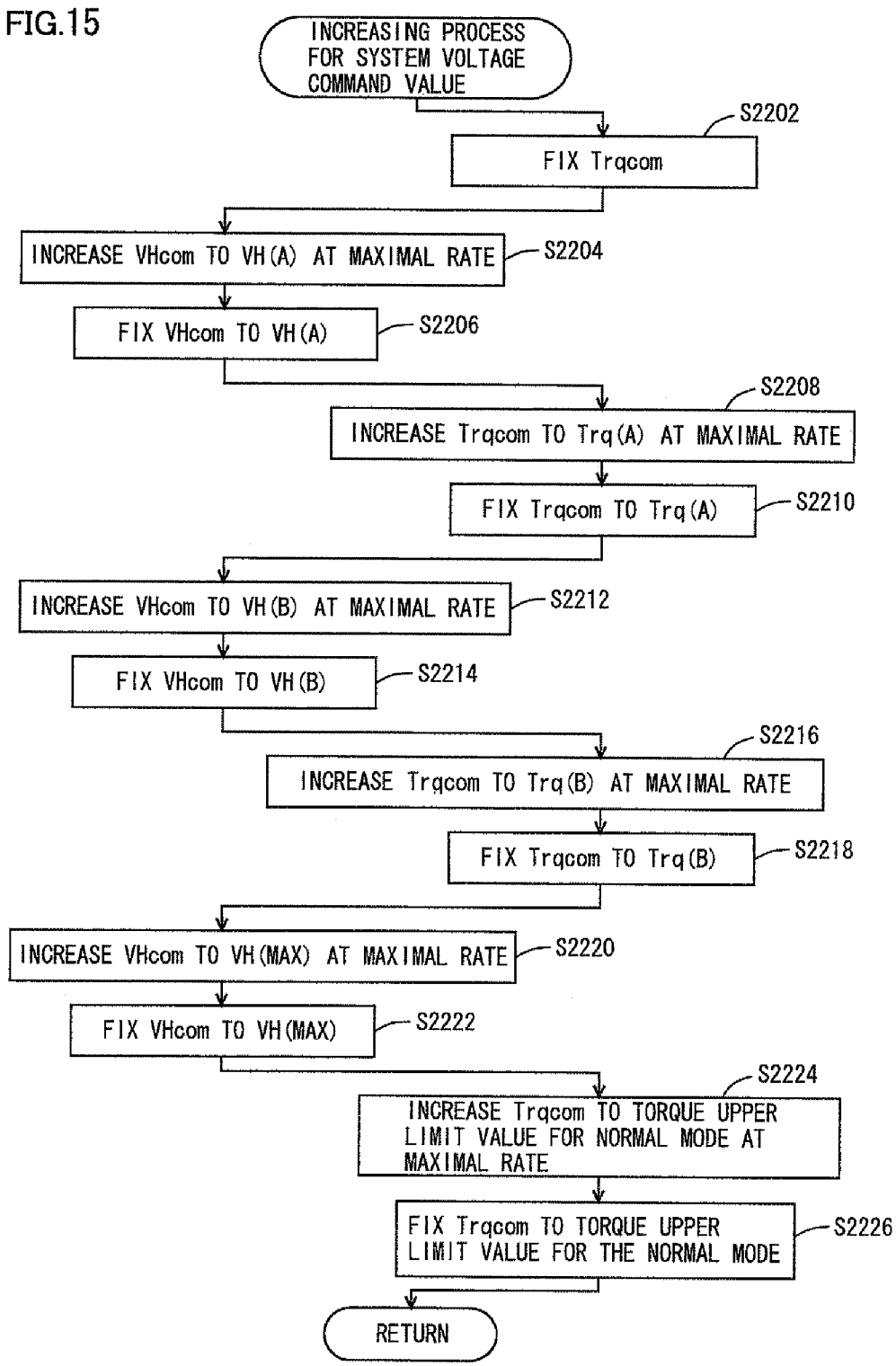
FIG. 15 is a flowchart showing a control structure of a control device according to a third embodiment of the present invention.

Referring to FIG. 15, the following describes a control structure of a program executed when control device 3000 according to the present embodiment performs the increasing process for system voltage command value VHcom (cooperative control for system voltage command value VHcom and torque command value Trqcom).

In S2202, control device 3000 fixes torque command value Trqcom. In S2204, control device 3000 increases system voltage command value VHcom to a predetermined voltage value VH(A) at a maximal rate. VH(A) is a value larger than VH(1) but smaller than VH(MAX). In S2206, control device 3000 fixes system voltage command value VHcom to VH(A).

In S2208, control device 3000 increases torque command value Trqcom to Trq(A) at a maximal rate. Trq(A) is a value larger than the torque upper limit value for the saving mode but smaller than the torque upper limit value for the normal mode. In S2210, control device 3000 fixes torque command value Trqcom to Trq(A).

In S2212, control device 3000 increases system voltage command value VHcom to a predetermined voltage value VH(B) at the maximal rate. VH(B) is a value larger than VH(A) but smaller than VH(MAX). In S2214, control device 3000 fixes system voltage command value VHcom to VH(B).

In S2216, control device 3000 increases torque command value Trqcom to Trq(B) at the maximal rate. Trq(B) is a value larger than Trq(A) but smaller than the torque upper limit value for the normal mode. In S2218, control device 3000 fixes torque command value Trqcom to Trq(B).

In S2220, control device 3000 increases system voltage command value VHcom to VH(MAX) at the maximal rate. In S2222, control device 3000 fixes system voltage command value VHcom to VH(MAX).

In S2224, control device 3000 increases torque command value Trqcom to the torque upper limit value for the normal mode at the maximal rate. In S2226, control device 3000 fixes torque command value Trqcom to the torque upper limit value for the normal mode.

Figure 16:
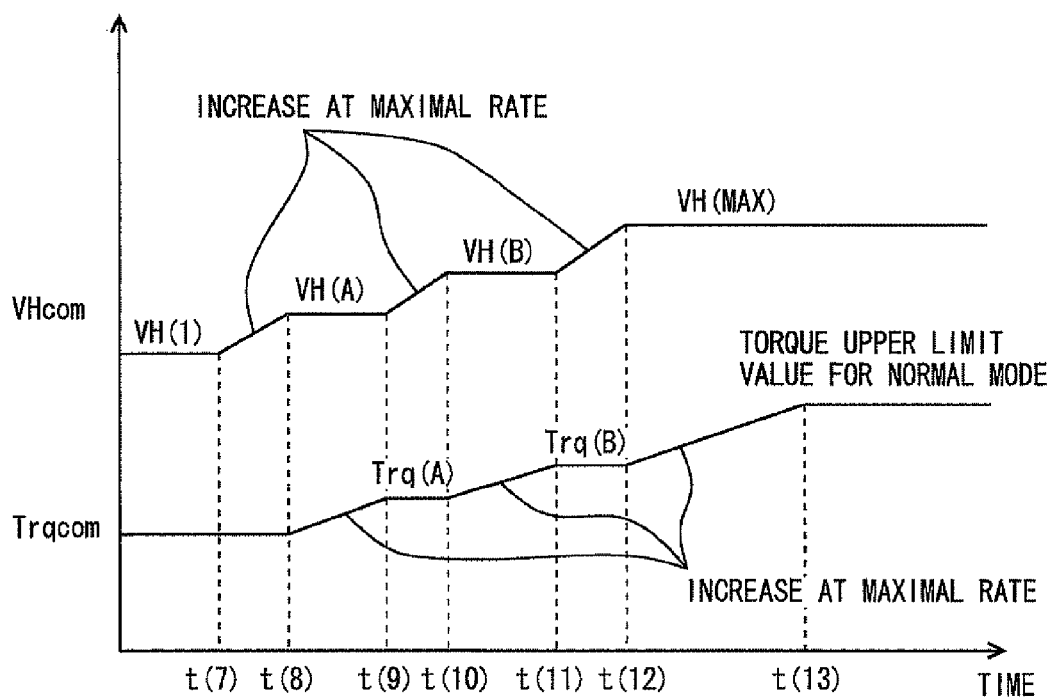
FIG. 16 is a timing chart of a system voltage command value and a torque command value, each of which is controlled by the control device according to the third embodiment of the present invention.

Referring to FIG. 16, the following describes how system voltage command value VHcom and torque command value Trqcom, which are controlled by control device 3000 according to the present embodiment based on the flowchart of the above-described structure, are changed with passage of time.

As shown in FIG. 16, when the actual operating point has reached the torque upper limit value for the saving mode at time t(7) (YES in S112), torque command value Trqcom is fixed (S2202) and system voltage command value VHcom is increased to VH(A) at the maximal rate (S2204).

At and after time t(8) at which system voltage command value VHcom reaches VH(A), system voltage command value VHcom is fixed to VH(A) (S2206) and torque command value Trqcom is increased to Trq(A) at the maximal rate (S2208).

When system voltage command value VHcom has reached VH(A) smaller than VH(MAX) as such, system voltage command value VHcom is temporarily fixed to VH(A) and torque command value Trqcom is increased. Hence, it takes a shorter period of time for the output torque of alternating-current motor M1 to start increasing, as compared with the case where system voltage command value VHcom is first increased to VH(MAX) and then torque command value Trqcom is increased, for example. In this way, while restraining deviation of torque, the driver can be prevented from feeling uncomfortable (about slow acceleration).

At and after time t(9) at which torque command value Trqcom reaches Trq(A), torque command value Trqcom is fixed to Trq(A) (S2210) and system voltage command value VHcom is increased to VH(B) at the maximal rate (S2212).

At and after time t(10) at which system voltage command value VHcom reaches VH(B), system voltage command value VHcom is fixed to VH(B) (S2214) and torque command value Trqcom is increased to Trq(B) at the maximal rate (S2216).

At and after time t(11) at which torque command value Trqcom reaches Trq(B), torque command value Trqcom is fixed to Trq(B) (S2218) and system voltage command value VHcom is increased to VH(MAX) at the maximal rate (S2220).

At and after time t(12) at which system voltage command value VHcom reaches VH(MAX), system voltage command value VHcom is fixed to VH(MAX) (S2222) and torque command value Trqcom is increased at the maximal rate (S2224). At time t(13) at which torque command value Trqcom reaches the torque upper limit value for the normal mode, torque command value Trqcom is fixed (S2226).

As such, in the control device according to the present embodiment, when lifting the restriction on the system voltage for the saving mode and increasing the system voltage, system voltage command value VHcom and torque command value Trqcom are stepwisely and alternately increased at their respective maximal rates, in consideration of the fact that the inverter is controlled by the rectangular wave voltage control. In this way, while restraining deviation of torque, it takes a shorter period of time for the output torque of the motor to start increasing, thereby preventing the driver from feeling uncomfortable (about slow acceleration).

Fourth Embodiment

Hereinafter, a control device according to a fourth embodiment of the present invention will be described. It should be noted that the control device according to the present embodiment performs the increasing process for system voltage command value VHcom (cooperative control for system voltage command value VHcom and torque command value Trqcom) in a way different from the process (S200 in FIG. 8 and the process in FIG. 9) performed by the control device according to the first embodiment. Processes other than this are the same as those in the first embodiment. Hence, detailed explanation is not repeated here for the same control block diagrams and flowcharts as those of the control device of the first embodiment.

Figure 17:
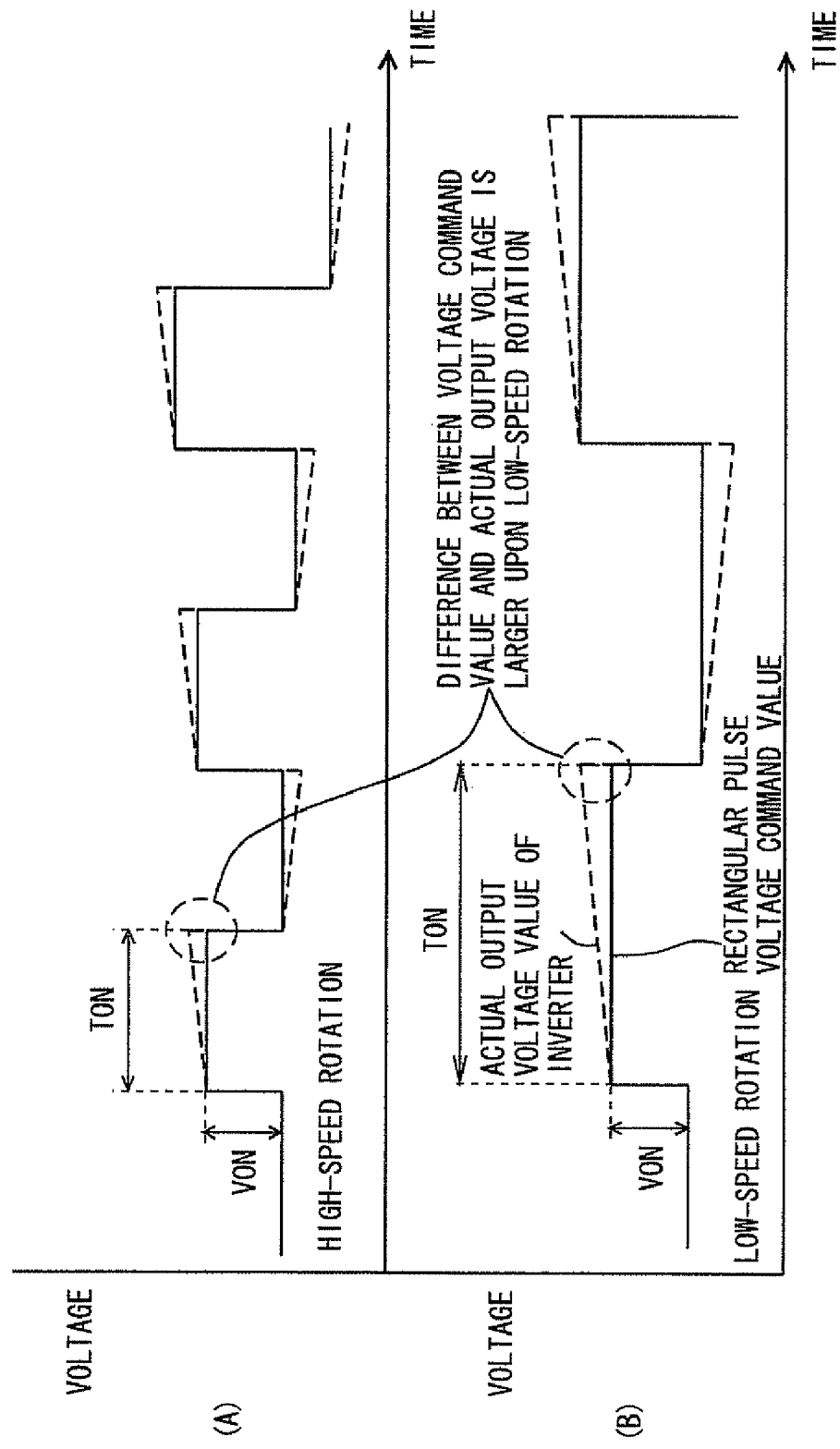
FIG. 17 is a second diagram showing an output voltage of an inverter and a voltage command value of a rectangular wave pulse.

As described in the first embodiment, in the rectangular wave voltage control, only one switching is performed for each cycle of an electrical angle. Hence, on period TON of the rectangular wave pulse differs depending on motor rotation speed N. Specifically, as shown in FIG. 17, when motor rotation speed N is low (see FIG. 17(B)), on period TON is longer than that when motor rotation speed N is high (see FIG. 17(A)). Accordingly, when the increase rate of system voltage command value VHcom remains the same, a difference between voltage command value VON in the rectangular wave pulse and the actual output voltage of inverter 14 will be larger upon high-speed rotation than that upon low-speed rotation.

In view of this, in the present embodiment, the increase rate of system voltage command value VHcom is changed according to motor rotation speed N so that the difference between voltage command value VON of the rectangular wave pulse and the actual output voltage of inverter 14 (amount of increase in system voltage VH during a period of time from a rise in on period TON of one rectangular wave pulse to a fall therein) is a fixed value irrespective of motor rotation speed N.

Figure 18:
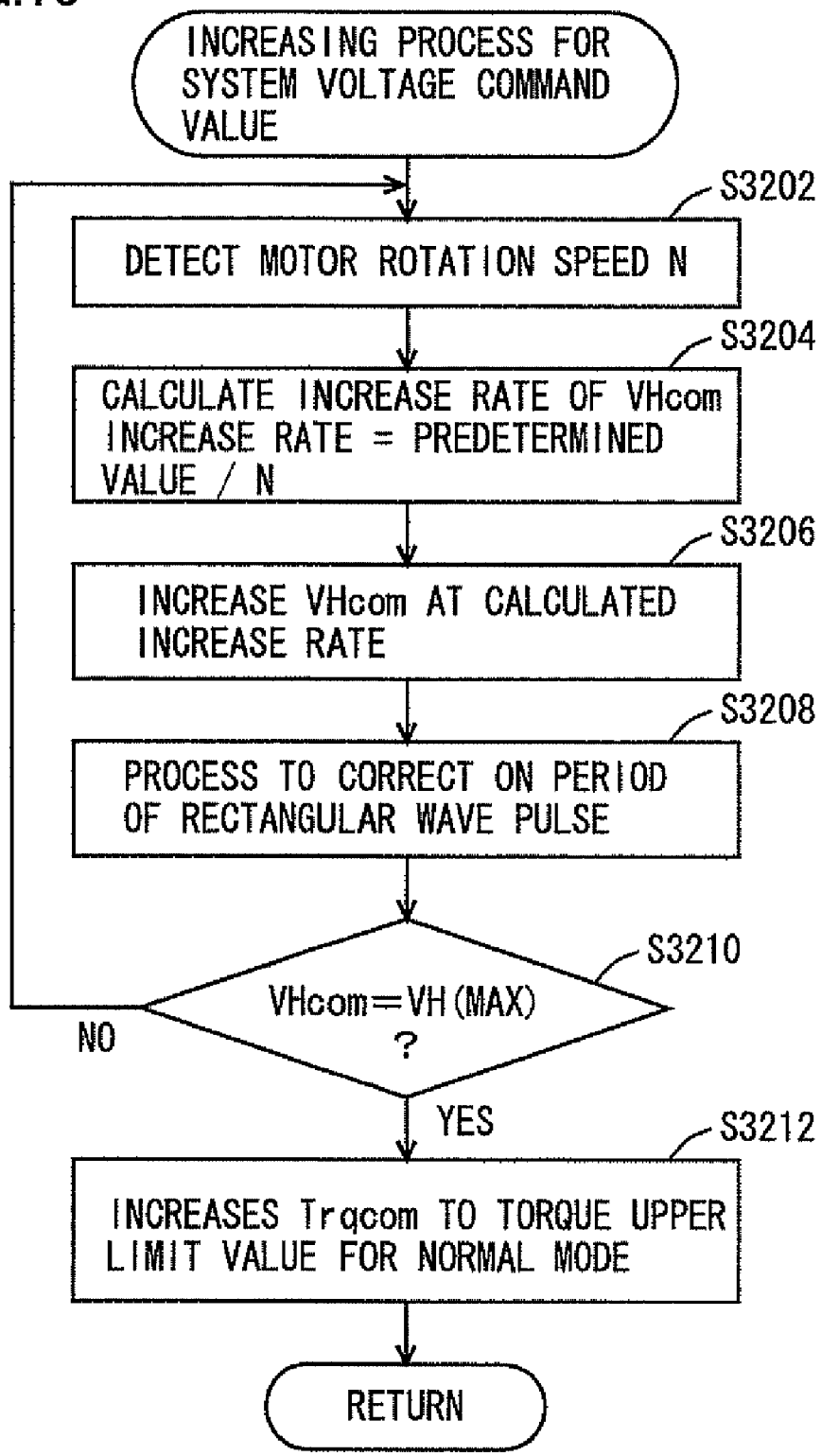
FIG. 18 is a flowchart showing a control structure of a control device according to a fourth embodiment of the present invention.

Referring to FIG. 18, the following describes a control structure of a program executed when control device 3000 according to the present embodiment performs the increasing process for system voltage command value VHcom (cooperative control for system voltage command value VHcom and torque command value Trqcom).

In S3202, control device 3000 detects motor rotation speed N. In S3204, control device 3000 calculates to divide a predetermined value by motor rotation speed N and regards the divided value as the increase rate of system voltage command value VHcom. It should be noted that this predetermined value is a value corresponding to the amount of increase in system voltage VH during on period TON of one rectangular wave pulse, and is set through feedback control at a value allowing for restraint of deviation of torque. In other words, control device 3000 calculates the increase rate of system voltage command value VHcom in accordance with motor rotation speed N so that the amount of increase in system voltage VH during on period TON of one rectangular wave pulse is an amount of increase (i.e., predetermined value) allowing for restraint of deviation of torque.

In S3206, control device 3000 increases system voltage command value VHcom at the increase rate thus calculated.

In S3208, control device 3000 processes to correct on period TON of the rectangular wave pulse. Specifically, control device 3000 corrects on period TON(N) of an N-th rectangular wave pulse by the predetermined value/2 (i.e., average value of the amount of increase in system voltage VH during on period TON of one rectangular wave pulse).

In S3210, control device 3000 determines whether or not system voltage command value VHcom has reached VH(MAX). When it has reached VH(MAX) (YES in S3210), the process goes to S3212. Otherwise (NO in S3210), the process goes back to S3202.

In S3212, control device 3000 increases torque command value Trqcom to the torque upper limit value for the normal mode at the maximal rate.

The following describes how system voltage command value VHcom and torque command value Trqcom, which are controlled by control device 3000 according to the present embodiment based on the flowchart of the above-described structure, are changed with passage of time.

In the control device according to the present embodiment, when lifting the restriction on the system voltage for the saving mode and increasing the system voltage, system voltage command value VHcom is increased at such an increase rate that the amount of increase in system voltage VI-1 during on period TON of one rectangular wave pulse is fixed (at the predetermined value) irrespective of motor rotation speed N (S3202-S3206), in consideration of the fact that the inverter is controlled by the rectangular wave voltage control. This predetermined value is set through feedback control at a value allowing for restraint of deviation of torque. Accordingly, even when the motor rotation speed is low, deviation of torque can be restrained.

Further, on period TON(N) of the rectangular wave pulse is corrected by the average value of the amount of increase in system voltage VH during on period TON of one rectangular wave pulse (S3208). In this way, deviation of torque can be restrained more appropriately.

Fifth Embodiment

Hereinafter, a control device according to a fifth embodiment of the present invention will be described. It should be noted that in addition to the control structure included in the control device according to the first embodiment, the control device according to the present embodiment further includes a control structure shown in a flowchart of FIG. 19 as described below. Processes other than this are the same as those in the first embodiment. Hence, detailed explanation is not repeated here for the same control block diagrams and flowcharts as those of the control device of the first embodiment.

Figure 19:
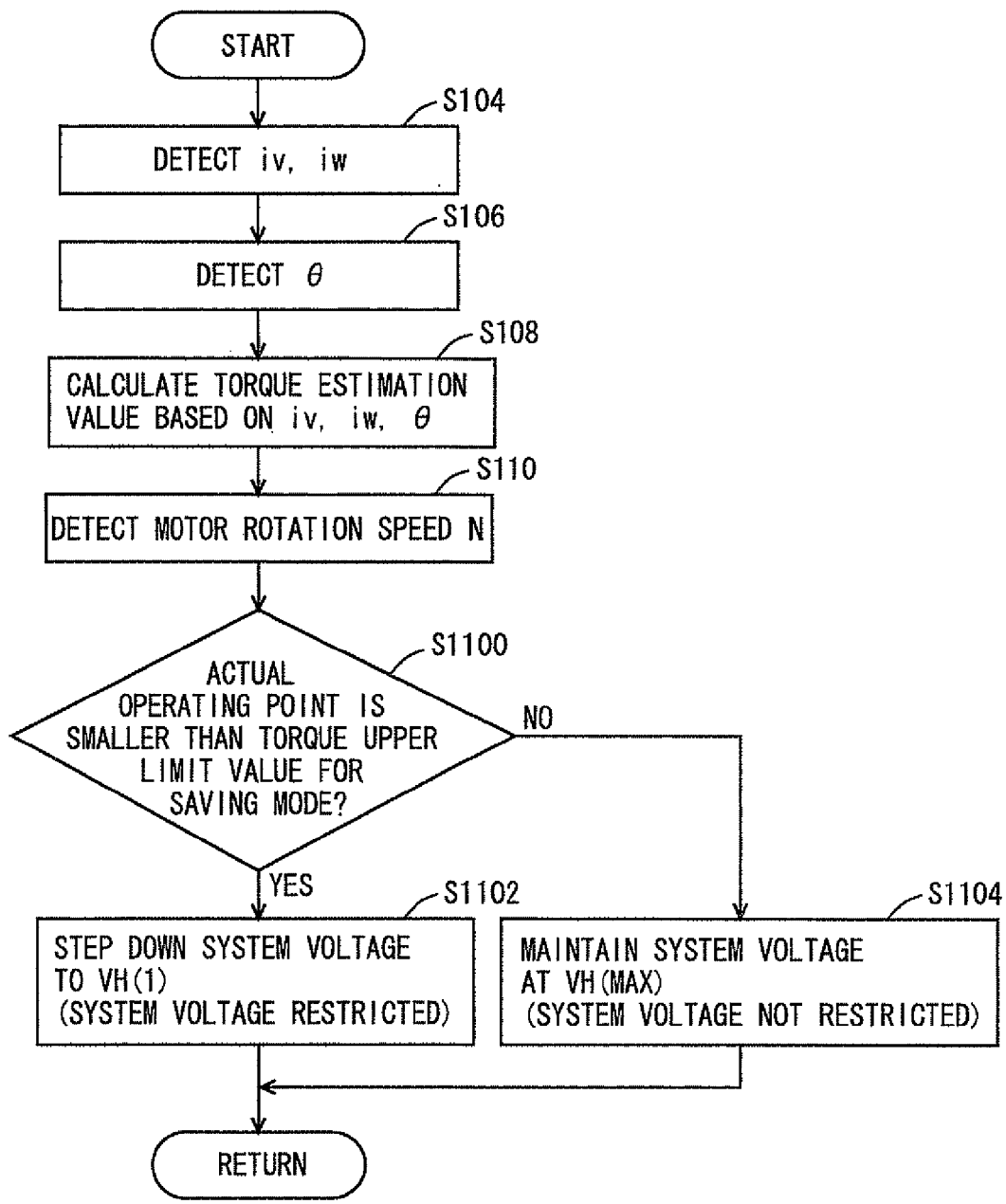
FIG. 19 is a flowchart showing a control structure of a control device according to a fifth embodiment of the present invention.

Referring to FIG. 19, a control structure of a program executed by control device 3000 according to the present embodiment will be described. The program is repeatedly executed for a predetermined cycle time when the restriction on system voltage VH is lifted and maintained at VH(MAX) in the saving mode. It should be noted that in the flowchart shown in FIG. 19, the same processes as those in the flowchart shown in FIG. 8 are given the same step numbers. They are performed in the same way. Hence, no detailed explanation therefor is repeated here.

In S1100, control device 3000 determines whether or not, in the map shown in FIG. 2, the actual operating point, which is an intersection point of torque estimation value Trq and motor rotation speed N, is in a region of values smaller than the torque upper limit value for the saving mode (solid line in FIG. 2). If it is in the region of values smaller than the torque upper limit value for the saving mode (YES in S1100), the process goes to S1102. Otherwise (NO in S1100), the process goes to S1104.

In S1102, control device 3000 decreases system voltage command value VHcom from VH(MAX) to VH(1) to restrict system voltage VH to VH(1).

In S1104, control device 3000 maintains system voltage VH at VH(MAX).

In the control device according to the present embodiment, when the restriction on system voltage VH is lifted and system voltage VH is maintained at VH(MAX) in the saving mode, whether to maintain system voltage VH at VH(MAX) (S1104) or to step down system voltage VH to VH(1) (S1102) is determined irrespective of accelerator pedal position ACC based on whether or not the actual operating point is in the region of values smaller than the torque upper limit value for the saving mode (S1100).

In other words, when accelerator pedal position ACC is larger than the threshold value but the actual operating point is included in the region of values smaller than the torque upper limit value for the saving mode (YES in S1100), system voltage VH is stepped down to VH(1). Accordingly, power loss can be reduced in converter 12 as compared with a case where system voltage VH is maintained at VH(MAX) when accelerator pedal position ACC is larger than the threshold value.

It should be considered that the embodiments disclosed herein are illustrative and non-restrictive in any respect. The scope of the present invention is defined by the scope of claims, and is intended to include any modifications within the scope and meaning equivalent to the terms of the claims.

The invention claimed is:

1. A control device for a vehicle including a power storage device, a converter for variably stepping up a voltage provided from said power storage device, an inverter for converting power output from said converter, and a motor that operates using the power output from said inverter, the control device comprising:
   a first control unit for controlling an output voltage of said converter based on a voltage command value;
   a second control unit for controlling said inverter to supply said motor with a rectangular wave voltage that is based on a torque command value, which designates an output torque of said motor, and said voltage command value; and
   a third control unit for controlling said voltage command value and said torque command value such that a difference between said torque command value and an actual output torque of said motor is smaller than a predetermined value when increasing said voltage command value,
   said third control unit increasing said voltage command value and said torque command value, stepwisely and alternately.

2. The control device according to claim 1, wherein said third control unit increases said voltage command value and said torque command value at maximal increase rates respectively.

3. The control device according to claim 1, further comprising a voltage detecting unit for detecting said output voltage, wherein
   assuming that N is a natural number, said second control unit sets a period of time of supplying said rectangular wave voltage for the N-th time, based on said torque command value and said output voltage, which has been detected by said voltage detecting unit upon starting to supply said rectangular wave voltage for the N−1-th time.

4. A control device for a vehicle including a power storage device, a converter for variably stepping up a voltage provided from said power storage device, an inverter for converting power output from said converter, and a motor that operates using the power output from said inverter, the control device comprising:

a first control unit for controlling an output voltage of said converter based on a voltage command value;

a second control unit for controlling said inverter to supply said motor with a rectangular wave voltage that is based on a torque command value, which designates an output torque of said motor, and said voltage command value; and a third control unit for controlling said voltage command value and said torque command value such that a difference between said torque command value and an actual output torque of said motor is smaller than a predetermined value when increasing said voltage command value, said second control unit supplying said rectangular wave voltage to said motor once in each cycle of an electrical angle determined based on a rotational position of said motor, the control device further comprising a rotation speed detecting unit for detecting a rotation speed per unit time of said motor, said third control unit changing an increase rate of said voltage command value in accordance with said rotation speed such that an amount of increase in said output voltage during a period of time from start of supplying said rectangular wave voltage to end thereof once is a fixed value irrespective of said rotation speed.

5. The control device according to claim 4, wherein said second control unit corrects the period of time of supplying said rectangular wave voltage once, based on the amount of increase in said output voltage.

6. A control device for a vehicle including a power storage device, a converter for variably stepping up a voltage provided from said power storage device, an inverter for converting power output from said converter, and a motor that operates using the power output from said inverter, the control device comprising:

a first control unit for controlling an output voltage of said converter based on a voltage command value;

a second control unit for controlling said inverter to supply said motor with a rectangular wave voltage that is based on a torque command value, which designates an output torque of said motor, and said voltage command value;

a third control unit for controlling said voltage command value and said torque command value such that a difference between said torque command value and an actual output torque of said motor is smaller than a predetermined value when increasing said voltage command value;

an acceleration request detecting unit for detecting a degree of acceleration requested by a driver of said vehicle;

a current detecting unit for detecting a current provided to said motor;

a rotational position detecting unit for detecting a rotational position of said motor;

a rotation speed detecting unit for detecting a rotation speed per unit time of said motor;

an estimation unit for estimating the actual output torque of said motor based on the current detected by said current detecting unit and the rotational position detected by said rotational position detecting unit;

a restricting unit for restricting said voltage command value to a restriction value smaller than a step-up upper limit value of said converter; and a lifting unit for lifting a restriction on said voltage command value put by said restricting unit, when said restricting unit restricts said voltage command value, when said degree of acceleration requested, which has been detected by said acceleration request detecting unit, is larger than a predetermined degree, and when said output torque estimated by said estimation unit reaches a torque upper limit value determined based on said rotation speed detected by said rotation speed detecting unit and said restriction value, wherein when said lifting unit lifts the restriction on said voltage command value, said third control unit increases said voltage command value and said torque command value.

7. The control device according to claim 6 further comprising a mode detecting unit for detecting which travel mode is selected by the driver of said vehicle from a normal mode and a saving mode, wherein when said mode detecting unit detects that said saving mode is selected, said restricting unit restricts said voltage command value to said restriction value.

8. A control method performed by a control device for controlling a vehicle including a power storage device, a converter for variably stepping up a voltage provided from said power storage device, an inverter for converting power output from said converter, and a motor that operates using the power output from said inverter, the control method comprising the steps of controlling an output voltage of said converter based on a voltage command value;

controlling said inverter to supply said motor with a rectangular wave voltage that is based on a torque command value, which designates an output torque of said motor, and said voltage command value; and controlling said voltage command value and said torque command value such that a difference between said torque command value and an actual output torque of said motor is smaller than a predetermined value when increasing said voltage command value, the step of controlling said voltage command value and said torque command value increasing said voltage command value and said torque command value, stepwisely and alternately.

9. The control method according to claim 8, wherein the step of controlling said voltage command value and said torque command value increases said voltage command value and said torque command value at maximal increase rates respectively.

10. The control method according to claim 8 further comprising the step of detecting said output voltage, wherein assuming that N is a natural number, the step of controlling said inverter sets a period of time of supplying said rectangular wave voltage for the N-th time, based on said torque command value and said output voltage, which has been detected upon starting to supply said rectangular wave voltage for the N−1-th time, in the step of detecting said output voltage.

11. A control method performed by a control device for controlling a vehicle including a power storage device, a converter for variably stepping up a voltage provided from said power storage device, an inverter for converting power output from said converter, and a motor that operates using the power output from said inverter, the control method comprising the steps of:

controlling an output voltage of said converter based on a voltage command value;

controlling said inverter to supply said motor with a rectangular wave voltage that is based on a torque command value, which designates an output torque of said motor, and said voltage command value; and controlling said voltage command value and said torque command value such that a difference between said torque command value and an actual output torque of said motor is smaller than a predetermined value when increasing said voltage command value, the step of controlling said inverter supplying said rectangular wave voltage to said motor once in each cycle of an electrical angle determined based on a rotational position of said motor, the control method further comprising the step of detecting a rotation speed per unit time of said motor, the step of controlling said voltage command value and said torque command value changing an increase rate of said voltage command value in accordance with said rotation speed such that an amount of increase in said output voltage during a period of time from start of supplying said rectangular wave voltage to end thereof once has a fixed value irrespective of said rotation speed.

12. The control method according to claim 11, wherein the step of controlling said inverter corrects the period of time of supplying said rectangular wave voltage once, based on the amount of increase in said output voltage.

13. A control method performed by a control device for controlling a vehicle including a power storage device, a converter for variably stepping up a voltage provided from said power storage device, an inverter for converting power output from said converter, and a motor that operates using the power output from said inverter, the control method comprising the steps of:

controlling an output voltage of said converter based on a voltage command value;

controlling said inverter to supply said motor with a rectangular wave voltage that is based on a torque command value, which designates an output torque of said motor, and said voltage command value;

controlling said voltage command value and said torque command value such that a difference between said torque command value and an actual output torque of said motor is smaller than a predetermined value when increasing said voltage command value;

detecting a degree of acceleration requested by a driver of said vehicle;

detecting a current provided to said motor;

detecting a rotational position of said motor;

detecting a rotation speed per unit time of said motor;

estimating the actual output torque of said motor based on the current detected in the step of detecting the current and the rotational position detected by the step of detecting said rotational position;

restricting said voltage command value to a restriction value smaller than a step-up upper limit value of said converter; and lifting an restriction on said voltage command value put by the step of restricting said voltage command value, when said voltage command value is restricted by the step of restricting said voltage command value, when said degree of acceleration requested, which has been detected by the step of detecting said degree of acceleration requested, is larger than a predetermined degree, and when said output torque estimated by the step of estimating said output torque reaches a torque upper limit value determined based on said rotation speed, which has been detected by the step of detecting said rotation speed, and said restriction value, the step of controlling said voltage command value and said torque command value increasing said voltage command value and said torque command value, when said restriction is lifted by the step of lifting the restriction on said voltage command value.

14. The control method according to claim 13, further comprising the step of detecting which travel mode is selected by the driver of the said vehicle from a normal mode and a saving mode, wherein the step of restricting said voltage command value restricts said voltage command value to said restriction value, when it is detected that said saving mode is selected.

\* \* \* \* \*